United States Patent [19]

Sanders et al.

[11] Patent Number: 5,384,637
[45] Date of Patent: Jan. 24, 1995

[54] FIBER OPTIC GYROSCOPE MODULATION AMPLITUDE CONTROL

[75] Inventors: Glen A. Sanders, Scottsdale; Lee K. Strandjord, Glendale, both of Ariz.

[73] Assignee: Honeywell Inc., Minneapolis, Minn.

[21] Appl. No.: 684,721

[22] Filed: Apr. 12, 1991

[51] Int. Cl.[6] .............................................. G01B 9/02
[52] U.S. Cl. .................................................... 356/350
[58] Field of Search ........................................ 356/350

[56] References Cited

U.S. PATENT DOCUMENTS 4,705,399 11/1987 Graindorge et al. ................ 356/350
4,825,261 4/1989 Schroeder ............................ 356/350

OTHER PUBLICATIONS

"Resonator Fiber-Optic Gyro Using LiNbO3 Integrated Optics at 1.5-μm Wavelength," Sanders et al, *Proceedings of SPIE*, vol. 985, pp. 202–210, (1985).

"Double Closed-Loop Hybrid Fiber Gyroscope Using Digital Phase Ramp," Lefevre et al, *Proceedings of 3rd International Conference Optical Fiber Sensors*, Technical Digest Series, PDS 7.1–7.8 (1985).

"Serrodyne Modulator in a Fibre-Optic Gyroscope," Kay, *IEEE Proceedings J. of Optoelectronics*, 132 (Part J, No. 5), pp. 259–264, (1985).

"Closed-Loop Fiber-Optic Gyroscope with a Sawtooth Phase-Modulated Feedback," Ebberg et al, *Optics Letters*, vol. 10, No. 6, pp. 300–302, Jun. 1985.

"Lithium Niobate Serrodyne Frequency Translator for Fiber-Optic Gyroscopes," Johnson et al, *SPIE Fiber Optic Gyros: 10th Anniversary Conference*, vol. 719 (1986).

*Primary Examiner*—Mark Hellner
*Attorney, Agent, or Firm*—John G. Shudy, Jr.

[57] ABSTRACT

An amplitude reset controller for a resonator fiber optic gyroscope using a feedback loop and modulation to control amplitudes of a serrodyne waveform provided by a serrodyne signal generator at an operation frequency depending on resonance conditions in the resonator. The controller with a single serrodyne signal generator switches between such control at greater rotation rates and the removal of such control at smaller rotation rates, using instead a reference command. Also, a blanking operation mode can be additionally used to eliminate signals controlling the controlled frequency adjustment signal generator operation frequency during phase resets in its output serrodyne signal.

40 Claims, 12 Drawing Sheets

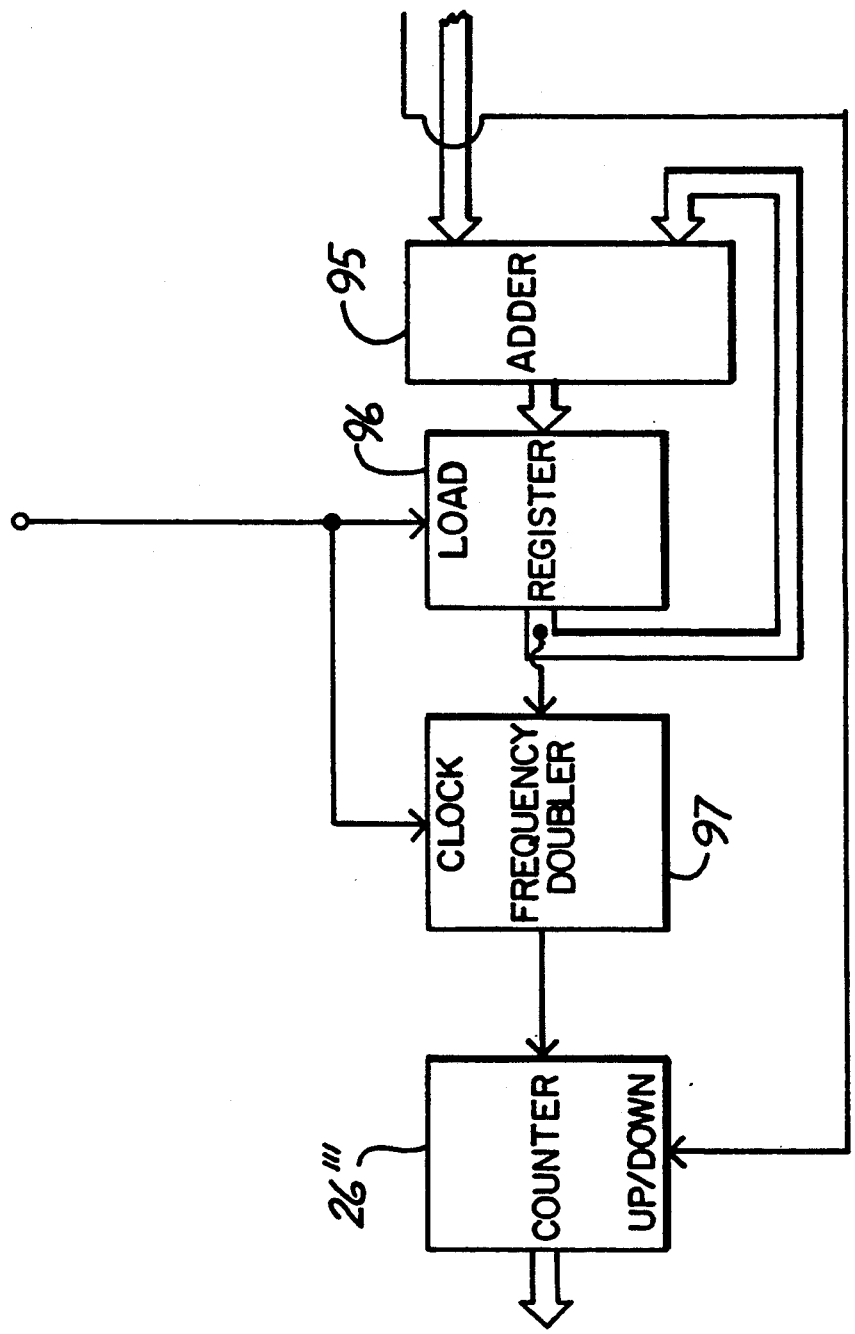

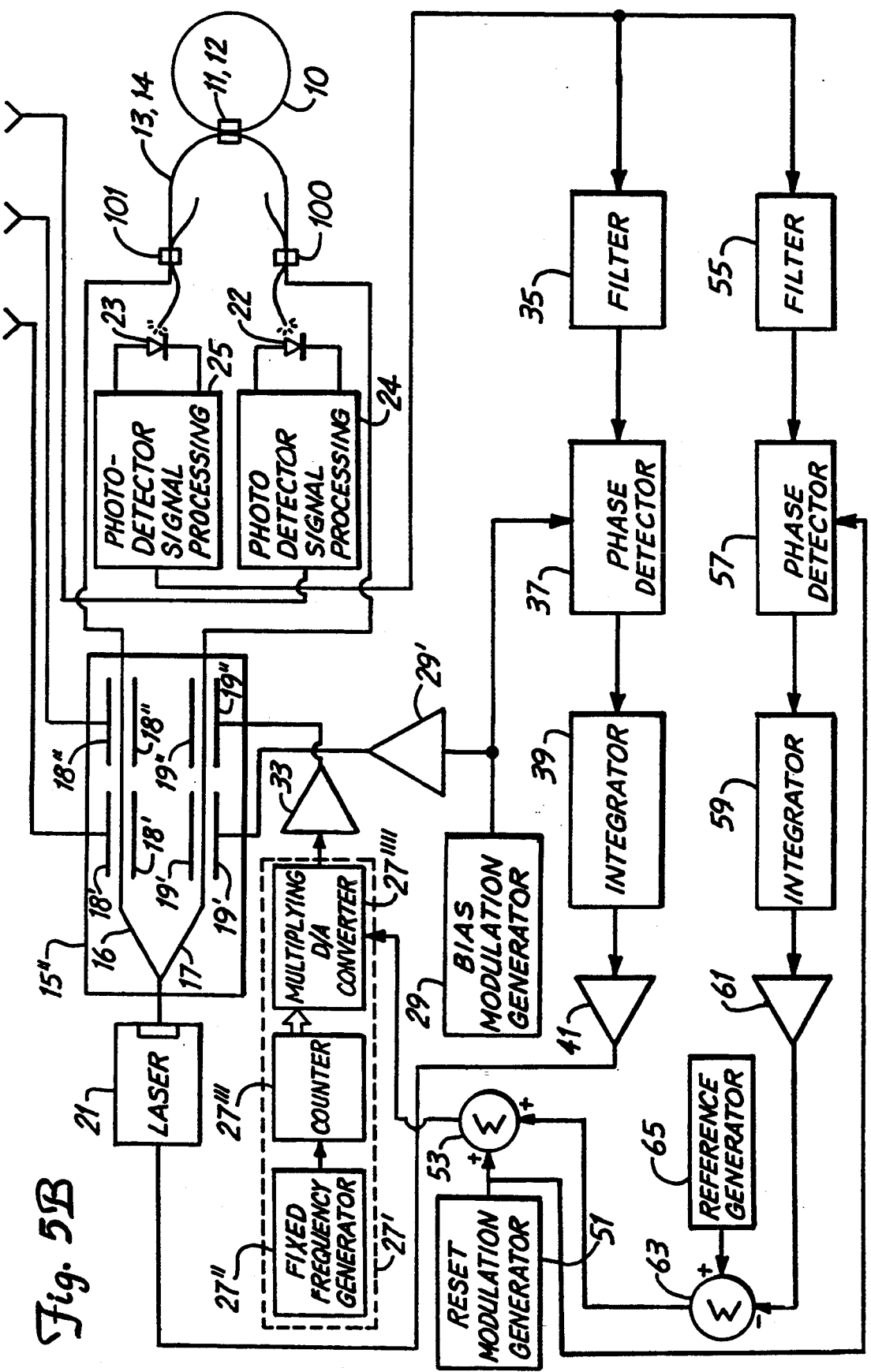

FIBER OPTIC GYROSCOPE MODULATION AMPLITUDE CONTROL

BACKGROUND OF THE INVENTION

The present invention relates to fiber optic gyroscopes used for rotation sensing and, more particularly, to resonator fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates that can be a problem in other kinds of optical gyroscopes.

There are various forms of optical inertial rotation sensors which use the well known Sagnac effect to detect rotation about a pertinent axis thereof. These include active optical gyroscopes having the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes such as low rotation rate lock-in, bias drift and some causes of scale factor variation.

Interferometric fiber optic gyroscopes typically employ a single spatial mode optical fiber of a substantial length formed into a coil, this substantial length of optical fiber being relatively costly. Resonator fiber optic gyroscopes, on the other hand, are constructed with relatively few turns of a single spatial mode optical fiber giving them the potential of being more economical than interferometric fiber optic gyroscopes. A resonator fiber optic gyroscope typically has three to fifty meters of optical fiber in its coil versus 100 to 2,000 meters of optical fiber in coils used in interferometric fiber optic gyroscopes. In addition, resonator fiber optic gyroscopes appear to have certain advantages in scale factor linearity and dynamic range.

In either type of passive gyroscope, these coils are part of a substantially closed optical path in which an electromagnetic wave, or light wave, is introduced and split into a pair of such waves, to propagate in opposite directions through the optical fiber coil to both ultimately impinge on a photodetector or photodetectors, a single photodetector for both waves in interferometric fiber optic gyroscopes and on corresponding ones of a pair of photodetectors in resonator fiber optic gyroscopes. Rotation about the sensing axis of the core of the coiled optical fiber in either direction provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce corresponding phase shifts between those waves in interferometric fiber optic gyroscopes, or corresponding different optical cavity effective optical path lengths for these waves in a resonator fiber optic gyroscope.

In this latter instance, one or more optical frequency shifters are used to each effectively adjust the frequency of a corresponding one of the pair of electromagnetic waves that circulate in opposite directions in the resonator fiber optic coil. This is accomplished through such a frequency shifter shifting the frequency of a corresponding input electromagnetic wave giving rise to the resonator electromagnetic wave of interest. As a result, through feedback arrangements, the frequencies of each member of the pair of electromagnetic waves can be kept in resonance with the effective optical path length that wave is experiencing in the resonator fiber optic coil. Hence, any frequency difference between these waves becomes a measure of the rotation rate experienced by the resonator fiber optic coil about the axis around which this coil has been positioned. In such resonances, each wave has the portions thereof that previously were introduced in the resonator coil and have not yet dissipated, and the portions thereof currently being introduced in the resonator coil, at a frequency such that they are all in phase with one another so they additively combine to provide a peak in the intensity of that wave in that resonator over a local range of frequencies.

The difference in frequency between the members of the pair of opposing electromagnetic waves in a resonant fiber optic gyroscope is desired to be constant when rotation conditions about the resonator optic fiber coil axis are unchanging thereby requiring that stable resonance conditions occur in that resonator in those circumstances. Furthermore, there are several advantages in achieving frequency shifting of the resonator electromagnetic waves by operating one or more integrated optics phase modulators for this purpose through each of which the corresponding input electromagnetic wave is transmitted. These advantages involve economics, packaging volume, and performance. Obtaining a constant frequency difference between these resonator wave pair members using such a phase modulator requires that the phase modulator change phase in the form of a linear ramp since the derivative of phase with respect to time yields the frequency.

Because of the impossibility of having a phase modulator provide an infinite duration linear ramp with respect to time, a repetitive linear ramp with periodic resetting of the phase to a reference value must be used. The resulting sawtooth phase change waveform results in what is termed serrodyne phase modulation of those electromagnetic waves passing through the modulator.

If the resetting of the serrodyne waveform from the ramp peak value, reached at the end of each linear ramp, back to an initial value is instantaneous, then, of course, the succeeding ramp begins immediately at the end of the preceding ramp. As a result, effectively, there is no change in frequency value based on the time derivative of the succeeding linear ramp from the value obtained from the time derivative of the preceding ramp. In practice, the reset time is not zero, and some high frequency signal components are introduced by the high rate of change of phase during such a reset. This results in unwanted harmonics, any unwanted effects of which must be avoided in the design of the system.

A further practical matter in connection with the serrodyne waveform is the magnitude of the phase change which occurs during such a reset. A phase change in one of the pair of input electromagnetic waves that equals a shift of one period of the frequency of the wave, or $2\pi$, leaves that input electromagnetic wave effectively in phase with the corresponding resonator electromagnetic wave. Hence, coupling that reset, or shifted, input wave into the resonator coil causes no changes to occur in the corresponding electromagnetic wave in resonance there. However, a shift of a different magnitude which may be close to, but not equal to, $2\pi$ means the portions of the input electromagnetic wave coupled into the resonator coil will not be in phase with the electromagnetic wave previously resonating there. This situation will lead to a relatively gradual changing of the phase of that resonating wave to the new value resulting from the reset as more of the input wave is coupled into the resonator coil. This resonator wave phase changing will continue until the input wave and the resonator wave are again effectively in phase, with the duration of the out of phase condition initially resulting from the reset leading to a similar duration of an error in the corresponding photodetector output signal.

Consider the known resonator fiber optical gyroscope system of FIG. 1. An optical cavity resonator, 10, formed by a continual path optical fiber is provided with an input directional coupler, 11, and an output directional optical coupler, 12. Resonator 10 is formed of a single spatial mode optical fiber which has two polarization eigenstates. Avoiding different optical path lengths for electromagnetic waves in each state is solved by thoroughly mixing the polarized waves in each state. In the first instance, such mixing is achieved by fabricating the resonator coil with two ends of a three to fifty meter length of such fiber spliced together so that the birefringence principal axes of the fiber are rotated 90° with respect to each other on opposite sides of the splice. The resonator fiber is characterized by a loss coefficient, $\alpha$, and an average of the propagation constants for the principal birefringence axes, $\beta_o$, assuming an ideal 90° splice.

Directional coupler 11 is fabricated by appropriately fusing together an input optical fiber, 13, with the optical fiber in resonator 10 with the fibers being tapered as they come into the fused portion on either side of that portion. Directional coupler 11 provides a phase shift of $\pi/2$ between an input electromagnetic wave and the resulting electromagnetic wave at the resonator output thereof, the output wave further being characterized with respect to the input electromagnetic wave by a coupler coupling coefficient, $k_1$, and a coupler loss coefficient, $\gamma_1$. Directional coupler 11 has a suitable packaging arrangement thereabout.

Directional coupler 12 is constructed in generally the same manner as is directional coupler 11, but here an output optical fiber, 14, is fused to the optical fiber of resonator 10. Directional coupler 12 is characterized by a coupler coupling coefficient, $k_2$, and a coupler loss coefficient, $\gamma_2$.

The opposite ends of input optical fiber 13 are each connected to an integrated optics chip, 15, formed with lithium niobate (LiNbO$_3$) as the base material therefor. These ends of fiber 13 are appropriately coupled to integrated optical waveguides, 16 and 17, formed in the base material of integrated optics chip 15. The relationship of the ends of input optical fiber 13 and the ends of integrated waveguides 16 and 17 are such that electromagnetic waves can be efficiently passed therebetween without undue losses. Integrated waveguide 16 is provided between a pair of metal plates formed on the base material of integrated optics chip 15 to provide a phase modulator, 18, therein. Similarly, integrated waveguide 17 is formed between a another pair of metal plates formed on the base material to result in a further phase modulator, 19, in integrated optics chip 15. Integrated waveguides 16 and 17 merge with one another into a single integrated waveguide, 20, to thereby provide a "Y" coupler in integrated optics chip 15.

A laser, 21, is coupled to integrated waveguide 20 in a suitable manner so that light may be transmitted efficiently from laser 21 to integrated waveguide 20. Laser 21 is typically a solid state laser emitting electromagnetic radiation having a wavelength of 1.3 $\mu$m with a spectral line width of one to hundreds of Khz. The wavelength at which laser 21 operates, or the frequency thereof, $f_o$, can be adjusted by signals at an input thereof. Typical ways of providing such adjustment is to control the temperature of, or the current through, the solid state laser, or through the "pumping" semiconductor light emitting diode for the solid state laser, which in the latter instance may be a Nd:Yag laser. Where the diode is the emitting laser, the laser type may be an external cavity laser, a distributed feedback laser or other suitable types.

Thus, electromagnetic radiation emitted by laser 21 at a variable frequency $f_o$ is coupled to integrated waveguide 20, and from there split into two portions to form a pair of electromagnetic waves traveling in the input optical path in directions opposite one another. That is, the electromagnetic wave portion transmitted through integrated waveguide 16 proceeds therethrough and past phase modulator 18 into input optical fiber 13, and through input directional coupler 11 where a fraction $k_1$ is continually coupled into resonator 10 to repeatedly travel therearound in a first direction, the counterclockwise direction, there being a continual fractional loss for that wave of $\gamma_1$ in coupler 11 as indicated above. The remaining portion of that wave, neither entering resonator 10 nor lost in coupler 11, continues to travel along input optical fiber 13 into integrated optical waveguide 17, through phase modulator 19, and finally through integrated waveguide 20 returning toward laser 21 (usually stopped by an isolator).

Similarly, the electromagnetic wave portion from laser 21, entering integrated waveguide 20 to begin in integrated waveguide 17, passes through phase modulator 19 into input optical fiber 13 and input directional coupler 11 where a fraction $k_1$ thereof is continually coupled into resonator 10, accompanied by a continual fractional loss of $\gamma_1$, to repeatedly traverse resonator 10 in a direction opposite (clockwise) to that traversed by the first portion coupled into resonator 10 described above. The remaining portion not coupled into resonator 10, and not lost in directional coupler 11, continues through input optical fiber 13 into integrated waveguide 16, passing through phase modulator 18, to again travel in integrated waveguide 20 in the opposite direction on its return toward laser 21.

The pair of opposite direction traveling electromagnetic waves in resonator 10, a clockwise wave and a counterclockwise wave, each have a fraction $k_2$ continually coupled into output optical fiber 14 with a fraction $\gamma_2$ of each continually lost in coupler 12. The counterclockwise wave is transmitted by coupler 12 and fiber 14 to a corresponding photodetector, 22, and the clockwise wave is transmitted by them to a corresponding photodetector, 23, these photodetectors being positioned at opposite ends of output optical fiber 14. Photodetectors 22 and 23 are typically p-i-n photodiodes each of which is connected in corresponding one of a pair of bias and amplifying circuits, 24 and 25, respectively.

The frequency of the electromagnetic radiation emitted by laser 21, after being split from its combined form in integrated waveguide 20 into separate portions in integrated waveguides 16 and 17, has each of its portions shifted from frequency $f_o$ to a corresponding resonance frequency by phase modulators 18 and 19, respectively. The portion of the electromagnetic wave diverted into integrated waveguide 16 is shifted from frequency $f_o$ to frequency $f_o+f_1$ by phase modulator 18, and this frequency shifted electromagnetic wave is then coupled by input directional coupler 11 into resonator 10 as the counterclockwise electromagnetic wave. Similarly, the portion of the electromagnetic wave directed into integrated waveguide 17 from integrated waveguide 20 is shifted in frequency from $f_o$ to $f_o+f_2$ by phase modulator 19 from whence it is coupled into resonator 10 by input directional coupler 11 to form the clockwise wave therein. These shiftings of frequency are caused by serrodyne waveforms applied to phase modulators 18 and 19, the serrodyne waveform for phase modulator 18 being supplied from a controlled serrodyne generator, 26, and the serrodyne waveform for phase modulator 19 being provided by a serrodyne generator, 27.

Thus, controlled serrodyne generator 26 provides a sawtooth waveform output signal having a repetitive linear ramp variable frequency $f_1$, the frequency $f_1$ of this sawtooth waveform being controlled by an input shown on the left side of generator 26 in FIG. 1. The repetitive linear ramp frequency of the sawtooth waveform from serrodyne generator 27 is fixed, and is held at a constant value, $f_2$.

The clockwise electromagnetic wave in resonator 10 and the counterclockwise electromagnetic wave in resonator 10 must always have the frequencies thereof driven toward values causing these waves to be in resonance in resonator 10 for the effective optical path length each is experiencing. This includes the path length variation resulting from any rotation of resonator 10 about the symmetrical axis thereof that is substantially perpendicular to the plane of the loop forming that optical resonator. Since controlled serrodyne generator 26 has the frequency of its serrodyne waveform controlled externally, that frequency value can be adjusted to the point that the corresponding counterclockwise wave in resonator 10 is in resonance with its effective path length, at least in a steady state situation. There, of course, can be transient effects not reflecting resonance in situations of sufficiently rapid changes of rotation rates of resonator 10. On the other hand, the constant frequency of the sawtooth waveform of serrodyne generator 27 requires that the clockwise electromagnetic wave in resonator 10 be adjusted by other means, the means chosen here being adjustment of the frequency value of the light in laser 21. Thus, the adjustment of the value of the frequency $f_1$ of the sawtooth waveform of controlled serrodyne generator 26 can be accomplished independently of the adjustment of the frequency $f_o$ of laser 21 so that, in steady state situations, both the counterclockwise electromagnetic wave and the clockwise electromagnetic wave in resonator 10 can be in resonance therein despite each experiencing a different effective optical path length therein.

Adjusting the frequency of the counterclockwise and clockwise electromagnetic waves traveling in opposite directions in resonator 10 means adjusting the frequency of each of these waves so that they are operating at the center of one of the peaks in the corresponding intensity spectra for resonator 10 experienced by such waves. Maintaining the frequency of the counterclockwise and the clockwise waves at the center of a corresponding resonance peak in the corresponding one of the resonator intensity spectra would be a difficult matter if that peak had to be estimated directly without providing some additional indicator of just where the center of the resonance peak actually is. Thus, the system of FIG. 1 introduces a bias modulation with respect to each of the counterclockwise and clockwise waves in resonator 10 through phase modulators 18 and 19, respectively. Such a bias modulation of each of these waves is used in a corresponding feedback loop to provide a loop discriminant characteristic followed by a signal therein which is acted on by that loop to adjust frequency $f_o$ and $f_1$ as necessary to maintain resonance of the clockwise and counterclockwise waves, respectively.

A bias modulation generator, 28, provides a sinusoidal signal at a frequency $f_m$ which is added to the sawtooth waveform of frequency $f_1$ provided by controlled serrodyne generator 26 and that is used to shift the frequency of the counterclockwise wave in resonator 10. Similarly, a further bias modulation generator, 29, provides a sinusoidal waveform of a frequency $f_n$ which is added to the sawtooth waveform at frequency $f_2$ provided by serrodyne generator 27. Frequencies $f_m$ and $f_n$ differ from one another to reduce the effects of electromagnetic wave backscattering in the optical fiber of resonator 10. The adding of the sinusoidal signal provided by bias modulation generator 28 and the sawtooth waveform of controlled serrodyne generator 26 is accomplished in an appropriate summer, 30. The addition of the sinusoidal signal provided by bias modulator generator 29 to the sawtooth waveform provided by serrodyne generator 27 is accomplished in a further summer, 31.

The combined waveform provided at the output of summer 30 is amplified in a power amplifier, 32, which is used to provide sufficient voltage to operate phase modulator 18. Similarly, the combined output signal provided by summer 31 is provided to the input of a further power amplifier, 33, used to provide sufficient voltage to operate phase modulator 19. Thus, the input electromagnetic wave to resonator 10 from integrated waveguide 16 will contain instantaneous electric field component frequencies of:

$$f_o+f_1-f_m\Delta\phi_m \sin \omega_m t$$

where $\Delta\phi_n$ is the amplitude of the bias modulation phase change at frequency $f_n$.

The fraction of the electromagnetic wave reaching photodetector 22 through resonator 10 is not only shifted in frequency to a value of $f_o+f_1$, but is also frequency modulated at $f_m$. Depending on the difference between the resonance frequency and $f_o+f_1$, the intensity at that photodetector will thus have variations occurring therein at integer multiples of $f_m$ (though none will occur at exact resonance). These latter components have amplitude factors related to the deviation occurring in the sum of (a) the phase shift resulting from the propagation constant multiplied by the path length in the counterclockwise direction in resonator 10, plus (b) phase shifts due to rotation and other sources, from a value equaling an integer multiple of $2\pi$, a condition necessary for resonance along the effective optical path length in this direction.

Similarly, field components of electromagnetic waves in integrated waveguide 17 enroute to resonator 10 will have instantaneous frequency components equal to:

$$f_o + f_2 - f_n \Delta\phi_n \sin\omega_n t$$

where $\Delta\phi_n$ is the amplitude of the bias modulation phase change at frequency $f_n$.

The fraction thereof reaching photodetector 23 through resonator 10 is again shifted in frequency to a value in this instance of $f_o + f_2$ and frequency modulated at $f_n$. Again, the intensity at photodetector 23 will have variations therein at integer multiples of $f_n$ if these clockwise waves are not at exact resonance. These latter components also have amplitude factors related to the deviation of the sum of (a) the phase shift resulting from the propagation constant multiplied by the path length in the clockwise direction in resonator 10, plus (b) phase shifts due to rotation and other sources, from a value equaling an integer multiple of $2\pi$, again, a condition necessary for resonance along the effective optical path length in that direction.

Since the output signal of photodetector 22 has a frequency component at $f_m$ that is a measure of the deviation from resonance in resonator 10 in the counterclockwise direction, the output signal of bias and amplifier photodetector circuit 24 is provided to a filter, 34, capable of passing signal portions having a frequency component $f_m$. Similarly, the output signal of photodetector 23 has a frequency component at $f_n$ that is a measure of the deviation from resonance in the clockwise direction, and so a filter, 35, is provided at the output of photodetector bias and amplifier circuit 25 capable of passing signal components having a frequency of $f_n$.

The output signal from filter 34 is then provided to a phase detector, 36, at an operating signal input thereof. Phase detector 36 is a phase sensitive detector which also receives, at a demodulation signal input thereof, the output signal of bias modulation generator 28 which is the sinusoidal signal at frequency $f_m$. Similarly, the output signal from filter 35 is provided to an operating signal input of a further phase detector, 37, which also receives at a demodulation input thereof the output sinusoidal signal at frequency $f_n$ of bias modulation generator 29. The output signals of phase detectors 36 and 37 follow a loop discriminant characteristic so that they indicate how far from resonance are the corresponding frequencies in resonator 10.

The discriminant characteristic followed by the output of phase detectors 36 and 37 will change algebraic sign for the frequencies on either side of the resonance peak and will have a zero magnitude at the resonance peak or resonance center. In fact, for sufficiently small values of the bias modulation generator output signals, the characteristic followed by the output signals of phase detectors 36 and 37 will be close to the derivative with respect to frequency of the intensity spectrum near the corresponding resonance peak. Thus, the output characteristics followed by the output signals of phase detectors 36 and 37 provide signals well suited for a feedback loop used to adjust frequencies to keep the corresponding electromagnetic waves in resonance in resonator 10.

Errors in the feedback loop are to be eliminated, and so the output signal of phase detector 36 is supplied to an integrator, 38, and the output signal of phase detector 37 is supplied to a further integrator, 39. Deviations from resonance are stored in these integrators which are then used in the loop to force the waves back to resonance in resonator 10. The output signal of integrator 38, in turn, is supplied to an amplifier, 40, used to provide signals to the modulation input of controlled serrodyne generator 26, thus completing the feedback loop for adjusting serrodyne frequency $f_1$. Similarly, the output signal of integrator 39 is supplied to an amplifier, 41, which in turn has its outputs supplied to laser 21 to control the frequency $f_o$ of light being emitted by laser 21, thereby closing the remaining feedback loop.

This result can be better seen by considering in more detail the effects on one member of the input electromagnetic wave pair provided by laser 21 in input optical fiber 13 through its transmitting electromagnetic waves to integrated waveguide 20 that are subsequently diverted into two portions, one each in integrated waveguides 16 and 17 to each thus become the basis of one member of this pair. Consider the electromagnetic field component of the electromagnetic wave portion that has passed into integrated waveguide 16, where it becomes subject to the influence of phase modulator 18 as it passes to input fiber 13 and then to input directional coupler 11 to enter, in part, resonator 10. Assume that the electric field component of the electromagnetic wave from laser 21 can be written as $E_{in}e^{i\omega_o t}$, and that a fraction q thereof is transmitted into integrated waveguide 16. As a result of the phase modulation in phase modulator 18, there will be a shift $f_1$ in the frequency of the electromagnetic wave portion represented by electric field component $qE_i$ due to controlled serrodyne generator 26, and a phase change therein, $\Delta\phi\cos\omega_m t$, due to bias modulation generator 28 supplying a sinusoidal signal reaching phase modulator 18. Thus, the electromagnetic wave portion electric field component entering input directional coupler 11 may be represented as $qE_{in}e^{i(\omega_o+\omega_1)t}e^{i\Delta\phi\cos\omega_m t}$ where $\omega_o + \omega_1 = 2\pi(f_o + f_1)$. The static phase shift due to the propagation of light between laser 21 and coupler 11 has been neglected for simplicity since no significant effect would follow therefrom below.

A fraction $\sqrt{k_1}$ of this electromagnetic wave portion field component enters resonator 10 through input directional coupler 11 with a 90° phase shift, and of this only a fraction $\sqrt{1-\gamma_1}$ reaches resonator loop 10. Although electromagnetic waves with polarizations other than the eigenstate polarization of resonator 10 will enter coupler 11 and resonator 10, they will not be in resonance in resonator 10 and so will represent relatively little energy therein. The part of the input electromagnetic wave portion electric field component entering resonator 10 travels a distance $l_1$ therein to reach output directional coupler 12.

A fraction $\sqrt{k_2(1-\gamma_2)}$ of that electromagnetic wave field component reaching output directional coupler 12 is then coupled through another 90° phase shift to output optical fiber 14. The part remaining in resonator 10 then travels a distance $l_2$, over which it passes through the resonator splice indicated above with a phase shift $\theta$, to again reach input directional coupler 11 where a further fraction is lost therein and another fraction is coupled out of input directional coupler 11 to input optical fiber 13, with the remainder again traveling to output coupler 12, etc.

The foregoing process in resonator 10, and couplers 11 and 12, and input and output fibers 13 and 14 leads to an electromagnetic wave electric field component $E_d$ reaching photodetector 22 based on the electromagnetic wave portion in integrated waveguide 16. The electromagnetic wave electric field component $E_d$ in the polarization state resonant in resonator 10 reaching photodetector 22, after traveling along the optical path from laser 21 and through the devices therealong described above, can, in the linear ramp portion of a serrodyne wave before its reset and well after its last reset, be represented as:

$$E_d = qE_{in}i\sqrt{k_1}\sqrt{1-\gamma_1}\,e^{-i\beta l_i}\sqrt{k_2}\sqrt{1-\gamma_2}\,\{1 + e^{-i\beta l_2}\sqrt{1-k_2}\sqrt{1-\gamma_2}\,e^{-i\beta l_1}\sqrt{1-k_1}\sqrt{1-\gamma_1}\,e^{i\theta}e^{\pm i\phi_r} +$$

$$(e^{-i\beta l_2}\sqrt{1-k_2}\sqrt{1-\gamma_2}\,e^{-i\beta l_1}\sqrt{1-k_1}\sqrt{1-\gamma_1})^2 e^{2i\theta}e^{\pm i2\phi_r} +$$

$$(e^{-i\beta l_2}\sqrt{1-k_2}\sqrt{1-\gamma_2}\,e^{-i\beta l_1}\sqrt{1-k_1}\sqrt{1-\gamma_1})^3 e^{3i\theta} + e^{\pm i3\phi_r}\ldots\}$$

The parameter $\theta$ in this equation reflects any added phase shift due to the 90° splice described above. The parameter $\pm\phi_r$ represents the Sagnac phase shift induced by rotation in one direction or another about the axis of symmetry of resonator 10 perpendicular to a plane passing through all of that resonator. The effective propagation constant in the foregoing equation, $\beta$, giving the effective phase change per unit length and the effective loss per unit length, comprises several terms, or $\beta = \beta_{o-1} - i\alpha + \Delta\beta\sin\omega_m t$. The term $\beta_{o-1} = 2\pi n_{eff}(f_o + f_1)/c$, as indicated above, is the weighted average of the propagation constants of the two principal axes of birefringence of the optical fiber in resonator 10. This average is based on the fraction of travel over each axis by the electromagnetic waves in the resonator in the corresponding polarization state with axis changes due to the 90° rotation splice in the optical fiber of that resonator as described above. A rotation of other than 90° will give an uneven weighting to these axes. As was also described above, $\alpha$ is the coefficient giving the loss per unit length in the resonator optical fiber.

The parameter $\Delta\beta = 2\pi n_{eff}f_m\Delta\phi_m/c$ is the change in the effective propagation constant due to the incoming electromagnetic waves having been modulated sinusoidally at the rate $\omega_m$. Thus, although the last equation is indeed just for the counterclockwise traveling electromagnetic waves in resonator 10 reaching photodetector 22 that began in integrated optical waveguide 16, the counterpart equation for waves beginning in integrated waveguide 17 and traveling in the opposite direction in resonator 10 to reach photodetector 23 will be very similar, but will have the opposite sign for any rotation induced phase shift.

The foregoing equation for $E_d$ can be written more simply by making the substitution:

$$p \triangleq \sqrt{(1-k_1)(1-k_2)(1-\gamma_a)(1-\gamma_2)}\,e^{-i(\beta l_1 + \beta l_2 - \theta \pm \phi_r)}$$

With the preceding substitution, the equation for the electric field component at photodetector 22 before a reset becomes:

$$E_d = -qE_{in}\sqrt{k_1k_2(1-\gamma_1)(1-\gamma_2)}\,e^{-i\beta l_1}\sum_{n=0}^{\infty} p^n$$

Assuming that the completion of a reset in the serrodyne wave occurs at time $t_o$, and that the transit time for the electromagnetic waves in resonator 10 from input coupler 11 to output coupler 12 over optical fiber length $l_1$ is $\tau_1$ with the transit time around the entire resonator being $\tau$, the electromagnetic wave reaching photodetector 22 in the time $t_o \leq t < t_o + \tau_1$ will be as follows:

$$E_d = -qE_{in}\sqrt{k_1k_2(1-\gamma_1)(1-\gamma_2)}\,e^{-i\beta l_1}\sum_{n=0}^{\infty} p^n,$$

$$t_o \leq t < t_o + \tau_1$$

that is, there is no effect at photodetector 22 during this initial transit time at photodetector 22. That is because the change in the input electric field component of the electromagnetic wave, which has now changed from $E_{in}$ to $E'_{in}$, has not reached photodetector 22 yet in this time duration. The input electric field component of the counterclockwise electromagnetic wave after the reset of that wave can be written $E'_{in} = E_{in}e^{i\phi_s}$ where $\phi_s$ represents the phase change due to the reset in the serrodyne part of the phase of the electric field component of the electromagnetic wave portion in integrated waveguide 16.

After an interval of $\tau_1$, the change in the input electric field component of the counterclockwise electromagnetic wave reaches output coupler 12 for the first time but those portions of the input field component earlier introduced into resonator 10 prior to the reset continue to recirculate in resonator 10 with the phase they had at the introduction thereof, and they repeatedly reach output coupler 12. These earlier introduced portions still constitute the rest of the counterclockwise electromagnetic wave reaching input coupler 12 in the time duration immediately after $t_o + \tau_1$ following reset at $t_o$. Until those portions dissipate, there will thus be a mixture of phases in the electric field component of the counterclockwise electromagnetic wave. Thus, the electric field component of the counterclockwise electromagnetic wave at photodetector 22 can be written after $t_o + \tau_1$ as follows:

$$E_d = -qE_{in}\sqrt{k_1k_2(1-\gamma_1)(1-\gamma_2)}\,e^{-i\beta l_1}\{1 + pe^{-i\phi_s} +$$

$$p^2e^{-i\phi_s} + p^3e^{-i\phi_s} + \ldots\},\, t_o + \tau_1 \leq t < t_o + \tau_1 + \tau$$

$$E_d = -qE_{in}\sqrt{k_1k_2(1-\gamma_1)(1-\gamma_2)}\,e^{-i\beta l_1}\{1 + p + p^2e^{-i\phi_s} +$$

$$p^3e^{-i\phi_s} + \ldots\},\, t_o + \tau_1 + \tau \leq t < t_o + \tau_1 + 2\tau$$

$$E_d = -qE_{in}\sqrt{k_1k_2(1-\gamma_1)(1-\gamma_2)}\,e^{-i\beta l_1}\{1 + p + p^2 +$$

$$p^3e^{-i\phi_s} + \ldots\},\, t_o + \tau_1 + 2\tau \leq t < t_o + \tau_1 + 3\tau$$

-continued or, following reset at $t_o$, the representation for the electric field component of the counterclockwise electromagnetic wave will be:

$$E_d = -qE_{in}\sqrt{k_1k_2(1-\gamma_1)(1-\gamma_2)}\ e^{-i\beta l_1} \sum_{n=0}^{\infty} p^n,$$

$$t_o \leq t < t_o + \tau_1$$

$$E_d = -qE_{in}\sqrt{k_1k_2(1-\gamma_1)(1-\gamma_2)}\ e^{-i\beta l_1}\left(\sum_{n=0}^{m-1} p^n +\right.$$

$$\left. e^{-i\phi_s} \sum_{n=m}^{\infty} p^n \right), t_o + \tau_1 + (m-1)\tau \leq t < t_o + \tau_1 1 + m\tau,$$

$$\text{for } m = 1, 2, 3, \ldots$$

As can be seen in this last equation, there is clearly a delay before all of the electromagnetic wave portions traveling in one direction in resonator 10 fully represent a change in phase of the input electromagnetic wave giving rise to it. However, one can also see in the last equation that if the shift in phase in a serrodyne waveform at the end of a ramp is exactly $2\pi$, or $\phi_s = 2\pi$, the equations after reset at $t_o$ essentially reduces to the equation before reset so that the equations describing events after reset are the equivalent of the equation describing events before the reset.

Assuming that $\phi_s = 2\pi$, so that the equations above describing the electric field component of the counterclockwise wave reaching photodetector 22 before and after reset are equivalent, the next few components in the feedback loop following photodetector 22 will provide an error signal representing deviations from resonance that is on the discriminant characteristic over frequency described above. Taking the equation above representing the electric field component at photodetector 22 prior to reset and establishing the definitions, $$l \triangleq l_1 + l_2$$

$$a \triangleq \sqrt{(1-k_1)(1-k_2)(1-\gamma_1)(1-\gamma_2)}\ e^{-\alpha l}$$

$$\psi \triangleq \beta_{o-1}l + \Delta\beta l\sin\omega_m t - \theta \mp \phi_r$$

$$H \triangleq q\sqrt{k_1k_2(1-\gamma_1)(1-\gamma_2)}$$

results in that equation being written:

$$E_d = -E_{in}He^{-i\beta l_1} \sum_{n=0}^{\infty} (ae^{-i\psi})^n$$

The geometric progression in the summation on the right of the preceding equation can be put in the closed form known for such progressions to yield:

$$E_d = -E_{in}He^{-i\beta l_1} \frac{1}{1-ae^{-i\psi}}$$

The intensity of the counterclockwise electromagnetic wave impinging on photodetector 22 can be found, as is known from electromagnetic theory, by multiplying the electric field component thereof at photodetector 22 by its complex conjugate to give:

$$I_d(f_o + f_1, t) = E_d \cdot E_d^* = \frac{|E_{in}|^2 H^2}{1 + a^2 - 2a\cos\psi(f_o + f_1, t)}$$

Thus, the output of photodetector 22 will be a current proportional to $I_d$, and bias and amplification electronics 24 will then provide a voltage proportional to this current to be supplied at the input of filter 34.

Filter 34 can be a low pass filter having a cut-off frequency appropriately greater than $\omega_m$, or it can be a bandpass filter which passes frequencies about $\omega_m$. This is the frequency component to be selected from the output signal of bias and amplification electronics 24 as its amplitude will be a measure of the error, or the deviation from resonance of the electric field component of the counterclockwise electromagnetic wave in resonator 10.

The output of filter 34 is supplied to the signal input of phase detector 36. The output signal of bias modulation generator 28 is supplied to the demodulation input of phase detector 36, this signal being proportional to $\sin\omega_m t$. As a result, the output of phase detector 36 can be written:

$$v_{36}(f_o + f_1) = G_1 \int_0^{T_m} I_{d\text{-}filt}(f_o + f_1, t)\sin\omega_m t\, dt$$

where the output signal of the phase detector is the time average of (a) the signal at its signal input from the output of filter 34 represented as $I_{d\text{-}filt}$ and (b) the signal at its demodulation input, both multiplied together and having the average thereof taken over the period of the modulation signal, $T_m = 2\pi/\omega_m = 1/f_m$. The constant $G_1$ represents the effective gains of bias and amplification electronics 24, filter 34, and phase sensitive detector 36. This integral, as a function of $f_o + f_1$ occurring in the factor $\beta_o$ in $\Psi$, will provide an error signal, indicating by its value and algebraic sign where $f_o + f_1$ is with respect to resonance to thereby provide a discriminant characteristic over frequency for the corresponding feedback loop. This error signal directs that feedback loop to act to cause the counterclockwise wave in resonator 10 to take a frequency that permits it to be in resonance therein. Any errors along the discriminant function are stored in integrator 38 so that they may be corrected in this feedback loop. A similar result is reached for the feedback loop associated with the clockwise electromagnetic wave in resonator 10 provided to adjust the frequency $f_o + f_2$ so that wave also stays in resonance therein.

However, $\phi_s$ may well not equal $2\pi$, even if initially set at that value, because of component aging, temperature variations, and the like. As a result, the equation for the electric field component of the counterclockwise electromagnetic wave reaching photodetector 22 after a reset therein at $t_o$ must be used in determining the system response in that situation, or $$E_d = -qE_{in}\sqrt{k_1k_2(1-\gamma_1)(1-\gamma_2)}\ e^{-i\beta l_1}\left(\sum_{n=0}^{m-1} p^n + e^{-i\phi_s}\sum_{n=m}^{\infty} p^n\right),$$

$$t_o + \tau_1 + (m-1)\tau \leq t < t_o + \tau_1 + m\tau, \text{ for } m = 1, 2, 3, \ldots$$

Making the same substitutions as were made above, that equation can be written as:

$$E_d = -E'_{in}He^{-i\beta l_1}\left[(1-e^{-i\phi_s})\frac{1-a^n e^{-in\psi}}{1-ae^{-i\psi}} + e^{-i\phi_s}\frac{1}{1-ae^{-i\psi}}\right],$$

$$t_o + \tau_1 + (m-1)\tau \leq t < t_o\tau_1 + m\tau_1, \text{ for } m = 1, 2, 3, \ldots$$

where the closed form for the geometric progressions involved have been used.

Once again, the intensity is found by multiplying the electric field component of the counterclockwise electromagnetic wave portion appearing in the last equation by its complex conjugate with the following result:

$$I_d(f_o + f_1, t) = \frac{|E'_{in}|^2 H^2}{1 + a^2 - 2a\cos\psi}\{1 + 2a^{2n}(1 - \cos\phi_s) - 2a^n[(1-\cos\phi_s)\cos n\psi + \sin\phi_s \sin n\psi]\}$$

As can be seen from the foregoing equation, the factor outside of the brackets is the same expression for the intensity reaching photodetector 22 found above in the situation of $\phi_s$ being equal to $2\pi$. Thus, the factor in the brackets represents the results of having $\phi_s \neq 2\pi$. Because the factor outside of the brackets yielded a satisfactory discriminant characteristic over frequency, the factor within the brackets effectively represents an error in the discriminant characteristic which can lead to erroneous results of a degree depending on the deviation of $\phi_s$ from a value of $2\pi$ and the number of recirculations which have occurred since the reset. Thus, there is a desire to have a resonant fiber optic gyroscope system assuring that the serrodyne waveform reset value is equal to $2\pi$.

SUMMARY OF THE INVENTION

The present invention provides an amplitude reset controller for a phase modulator in a rotation sensor using a coiled optical fiber forming a closed optical path and having a coupler connected to permit electromagnetic waves to be coupled between the coiled optical fiber and an external optical fiber. Rotation is sensed based on having a pair of electromagnetic waves traveling through the coiled optical fiber in opposing directions to each impinge on a corresponding one of a pair of photodetectors. At least one of these opposing waves is subject to having its phase varied by selected signals supplied to an input of the phase modulator, and with the photodetector receiving that wave providing an output signal in response thereto that is representative of that wave. A first controlled frequency adjustment signal generator provides an output signal that essentially follows a serrodyne waveform to the phase modulator input at a selected operation frequency with amplitudes which can be adjusted in value. A controlled amplitude adjustment signal generator provides a signal, having a selected modulating frequency and a magnitude which can be varied, to an input of the controlled frequency adjustment signal generator at which the serrodyne waveform amplitude can be selected. An amplitude adjustment phase detector receives the output signal of the photodetector receiving the electromagnetic wave having its phase varied by the phase modulator. The amplitude adjustment phase detector also receives the output signal of the controlled amplitude adjustment signal generator to demodulate the photodetector output signal and provide the signal resulting from such demodulation to the controlled amplitude adjustment signal generator to adjust the amplitude of the signal provided thereby at the selected modulating frequency.

The amplitude reset controller with a single serrodyne signal generator switches between controlling in the manner described above at greater rotation rates and removing such control at smaller rotation rates in favor of reference command. Additionally, at smaller rotation rates, a blanking operation mode may be switched to that eliminates signals controlling the controlled frequency adjustment signal generator selected operation frequency during phase resets in its output serrodyne signal.

A similar arrangement can be used with another phase modulator that varies the phase of the other electromagnetic wave traveling in the coiled optical fiber. An integrator may be provided between the output of the amplitude adjustment phase detector and the controlled amplitude adjustment signal generator to eliminate errors. The electromagnetic waves in the resonator coil may reach corresponding photodetector either through the coupler initially described, or through a second coupler also connected to the coiled optical fiber to couple electromagnetic waves between it and another external optical fiber.

BRIEF DESCRIPTION OF THE DRAWINGS

FIGS. 4A, 4B, 4C, 4D and 4E show a system schematic diagrams representing a modification of a part of the signal processing arrangement shown in FIG. 3A; and FIGS. 5A and 5B show a system schematic diagram of a further resonator fiber optical gyroscope system also embodying the present invention combining a signal processing arrangement and an optical transmission path and device arrangement.

DETAILED DESCRIPTION OF THE PREFERRED EMBODIMENTS

Figure 1:
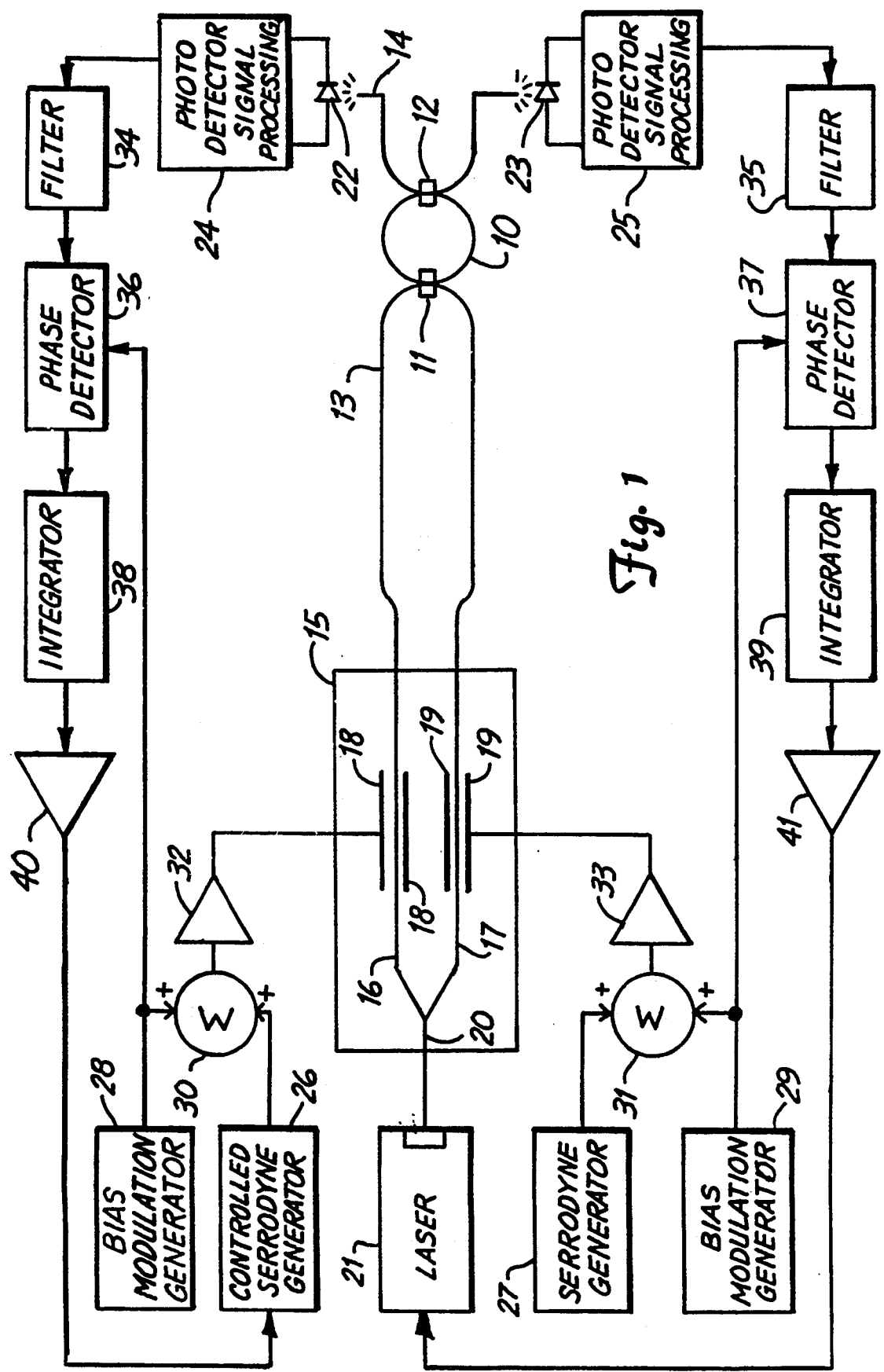
FIG. 1 shows a system schematic diagram of a resonator fiber optical gyroscope system known in the prior art combining a signal processing arrangement and an optical transmission path and device arrangement.
Figure 2A:
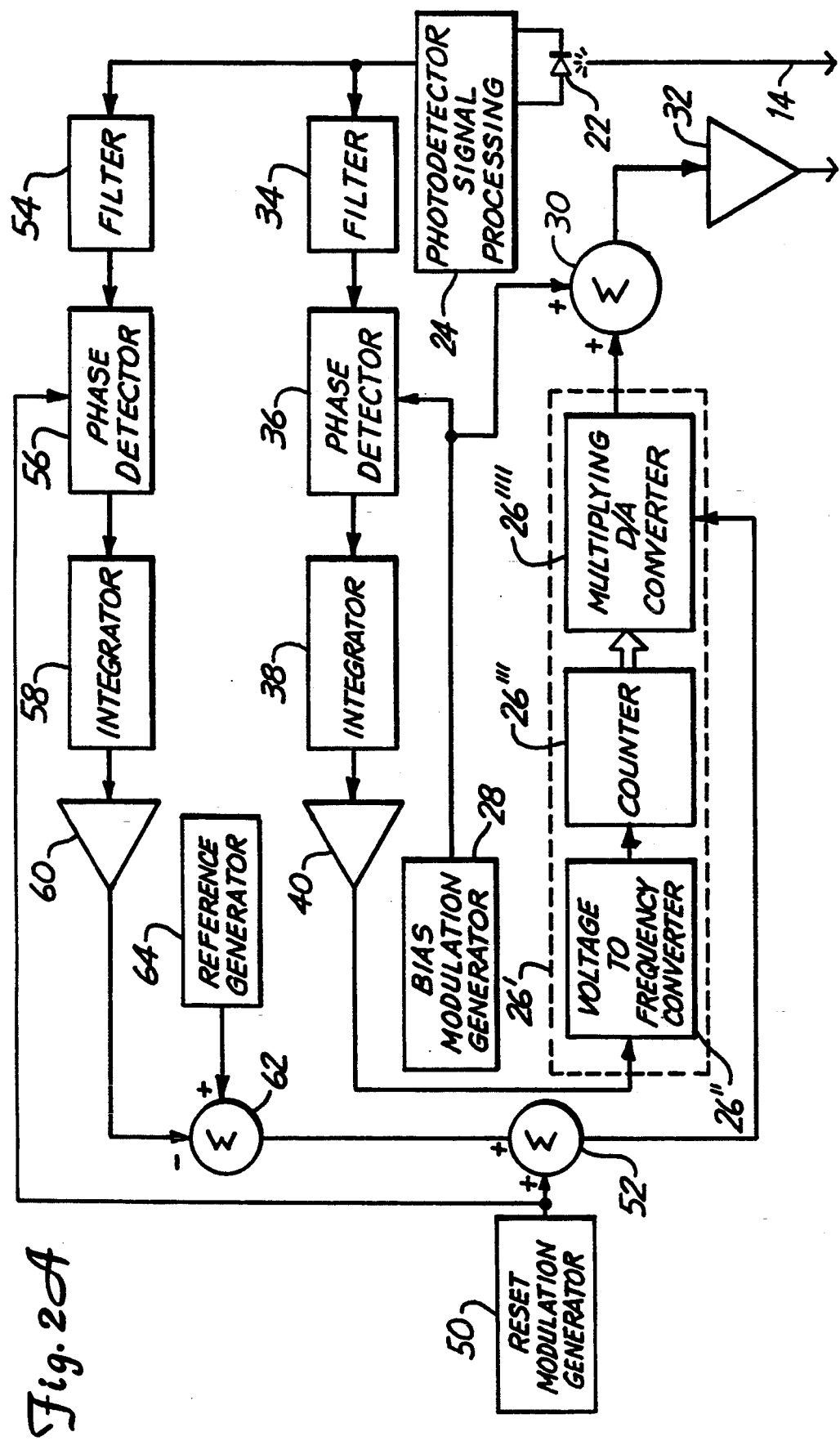
FIGS. 2A and 2B show a system schematic diagram of a resonator fiber optical gyroscope system embodying the present invention combining a signal processing arrangement and an optical transmission path and device arrangement.
Figure 2B:
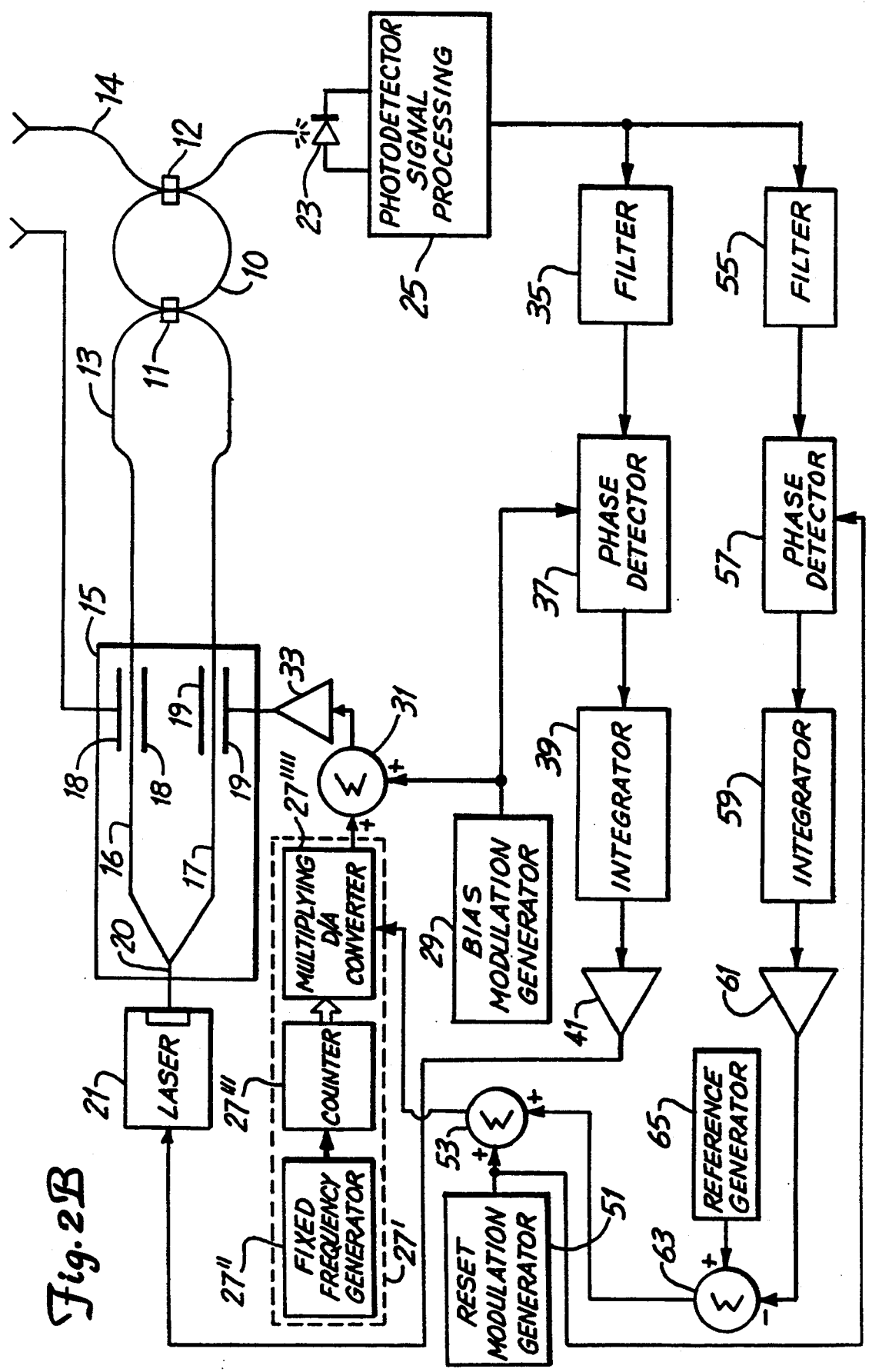

FIGS. 2A and 2B show an embodiment of the present invention in which a pair of feedback loops have been added to the system shown in FIG. 1 to form amplitude reset controllers for the serrodyne generators driving the phase modulators used in that system. The designations used for the various devices, transmission paths and blocks in FIGS. 2A and 2B are the same as those which were used in FIG. 1 for the corresponding items shown there.

A pair of sinusoidal signal generators, 50 and 51, each provide a sinusoidal output signal with generator 51 providing a sinusoidal output signal at frequency $f_u$ and generator 51 providing a sinusoidal output signal at frequency $f_v$. These output signals from generators 50 and 51 are each provided to a corresponding summing means, 52 and 53, respectively.

Summing means 52 and 53 provide output signals to modulation inputs of corresponding ones of the serrodyne generators to modulate the amplitudes of the serrodyne waves provided thereby. The output of summer 52 is provided to the modulation input of what is now a doubly controlled serrodyne generator (and so redesignated 26') since it not only has a frequency control input as described above, but also additionally now has an amplitude modulation input. The frequency of the serrodyne wave provided by doubly controlled serrodyne generator 26' remains variable and is again represented by $f_1$.

Doubly controlled serrodyne generator 26' has been shown in greater structural detail in FIG. 2A, where there is shown within the dashed line box of that generator three further blocks. The frequency control input of generator 26' is the input of a voltage-to-frequency converter, 26''. The frequency of the output signal of converter 26'', proportional to the voltage at its input, sets the rate of count accumulation in a counter, 26''', to which the output of converter 26'' is connected. The output count totals of counter 26''' are provided to a multiplying digital-to-analog converter, 26'''', to form a "staircase" waveform to approximate the linear "ramps" occurring in a true serrodyne waveform. The reference input of multiplying digital-to-analog converter 26'''' serves as the amplitude modulation input of generator 26'.

Summer 53 provides its output signal to what is now a controlled serrodyne generator, 27', at a modulation input thereof to amplitude modulate the serrodyne wave provided by that generator. The frequency of the serrodyne wave provided by controlled serrodyne generator 27' remains fixed and is again designated $f_2$.

Controlled serrodyne generator 27' has also been shown in greater structural detail in FIG. 2B, where there is shown within the dashed line box of that generator three further blocks. The first block is a fixed frequency generator, 27''. The frequency of the output signal of generator 27'' sets the rate of count accumulation in a counter, 27''', to which the output of generator 27'' is connected. The output count totals of counter 27''' are provided to a multiplying digital-to-analog converter, 27'''', to form a "staircase" waveform to approximate the linear "ramps" occurring in a true serrodyne waveform. The reference input of multiplying digital-to-analog converter 27'''' serves as the modulation input of generator 27'.

Thus, the sinusoidal adjustment or modulation of the amplitudes of the serrodyne waveform output signal of generator 26' by the signal from generator 50 affects the electromagnetic wave portion in integrated waveguide 16 through summer 30, amplifier 32 and phase modulator 18, and thereby introduces variation therein at frequency $f_u$. Similarly, sinusoidal amplitude modulation of the serrodyne wave provided by generator 27' due to the signal from generator 51 affects the electromagnetic waves in integrated waveguide 17 through phase modulator 19 to introduce variation therein at a frequency $f_v$. These variations in these waves, of course, reach resonator 10 and photodetectors 22 and 23, respectively, in the manner described above to appear in the output signals thereof.

The signal components related to the frequencies of generators 50 and 51 in the output signals of photodetectors 22 and 23, respectively, are provided to a pair of corresponding filters, 54 and 55. Filter 54, either a lowpass or a bandpass filter, has a frequency characteristic such that it is capable of passing signal components at frequency $f_u$ therethrough. Similarly, filter 55, again either a lowpass or a bandpass filter, has a frequency characteristic such that it is capable of passing signal components at frequency $f_v$ therethrough.

A phase detector, 56, receives the filtered signal from photodetector 22 at the signal input thereof from filter 54, and also receives the output signal of generator 50 at a demodulation input thereof. Similarly, a phase detector, 57, receives the filtered signal from photodetector 23 at a signal input thereof from the output of filter 55, and also receives the output signal of generator 51 at a demodulation input thereof.

The resulting signals from at the outputs of phase detectors 56 and 57, after demodulation, are provided to a corresponding pair of integrators, 58 and 59, respectively, which are used to remove errors in the feedback loop. The outputs from integrators 58 and 59 are provided to a pair of amplifiers, 60 and 61, respectively.

The amplified signals at the outputs of amplifiers 60 and 61 are provided to a further pair of summers, 62 and 63. These signals are subtracted from a corresponding adjustable reference signal nominally set at a value which would cause a reset in the corresponding serrodyne waveform of a value equal to $2\pi$.

The signal from amplifier 60 is subtracted in summer 62 from an adjustable, but otherwise constant, reference signal provided by a reference signal generator, 64. The result is sent to summer 52 to be summed with the sinusoidal output signal of signal generator 50. In the same manner, the signal from amplifier 61 is subtracted in summer 63 from an adjustable, but otherwise constant, reference signal provided a reference signal generator 65. The result is provided to summer 53 to be added to the sinusoidal output signal provided by generator 51.

Thus, a pair of feedback loops are provided in FIGS. 2A and 2B, one for each of serrodyne generators 26' and 27' for controlling the amplitude of the resets in the serrodyne approximation waveform provided by each. The addition of a sinusoidal modulating signal to the serrodyne approximation waveform generated in each at modulation frequencies $f_u$ and $f_v$, respectively, provides a discriminant characteristic in each loop to provide an error signal to operate the loop as can be seen in the following more detailed description of the signals occurring in such a loop.

The intensity of the electromagnetic waves impinging on photodetector 22 for a serrodyne wave of frequency of $f_1$ with a maximum phase excursion therein of $\phi_s$, absent any corrective action provided by the added feedback loops just described, is just that found for the system of FIG. 1, or $$I_d(f_o + f_1, t) = \frac{|E_{in}|^2 H^2}{1 + a^2 - 2a\cos\psi} \{1 + 2a^{2n}(1 - \cos\phi_s) - 2a^n[(1 - \cos\phi_s)\cos n\psi + \sin\phi_s \sin n\psi]\}$$

As indicated above in connection with this equation, an error arises in this intensity if $\phi_s \neq 2\pi$, the error appearing being due to the factor in the brackets on the right and below.

Reset modulation generator 50 is used to add a sinusoidal modulation at frequency $f_u$ to the amplitude values of the serrodyne wave (amplitude modulation) provided by now doubly controlled serrodyne generator 26', or $\phi_s(t) = 2\pi + \phi_\delta + \phi_a\sin\omega_u t = 2\pi + \phi_{s\Delta}(t)$, or $\phi_{s\Delta}(t) = \phi_\delta + \phi_a\sin\omega_u t$. In the first of these last equations, $\phi_\delta$ represents any small deviation (since such deviations will be corrected by the feedback added) occurring in the peak phase shift of the serrodyne wave, that is, its reset value. The amplitude factor of the sinusoid, $\phi_a$, represents the amplitude of the amplitude modulation provided by reset modulation generator 50 and doubly controlled serrodyne generator 26'. The term $\phi_{s\Delta}(t)$ represents the time changing portions of the reset value, or peak serrodyne phase change. Not only will the change in the reset value $\phi_\delta$ be small, but so will any shift from the resonance value of the electromagnetic waves in resonator 10 because of the presence of the feedback loops in FIG. 2 controlling them.

As a result, the last equation for the intensity of the electromagnetic waves impinging on photodetector 22 can be simplified by judiciously chosen approximations to more clearly bring out the effects of the sinusoidal modulation provided by reset modulation generator 50 and doubly controlled serrodyne generator 26'. The total phase delay around resonator 10 $\Psi = \beta_o l + \Delta\beta l \sin\omega_m t - \theta \pm \phi_r$ will always be very near an integer multiple M of $2\pi$ since the feedback loop operating in connection with frequency components at frequency $f_m$ will control the unmodulated part of this phase to being at or very near resonance. Thus, the deviation of this part of $\Psi$ from an integer multiple of $2\pi$, or $\Psi_\Delta = \Psi - 2\pi M$, will be much less than 1 in value, and can be rewritten as $\Psi_\Delta(f_o + f_1, t) \simeq \Psi_b \sin\omega_m t$ to signify that the modulation term in $\Psi$ is not controlled by the feedback loop.

Also, the integer value n increases in each successive period $\tau$, and a reasonable approximation therefor in the form of a continuous function is $n \simeq kt$ with $k = 1/\tau$. The following definitions are made:

$W(t) \quad a^{2n} \simeq a^{2kt}$ $X(t) \quad a^n \simeq a^{kt}$ $Y(t) \quad n^2 a^n \simeq k^2 t^2 a^{kt}$ $Z(t) \quad na^n \simeq kta^{kt}$ The integer value n reaches a maximum value and then begins again with a value of zero at the next serrodyne waveform reset. Therefore, n, W(t), X(t), Y(t) and Z(t) are all periodic functions that have a fundamental frequency component of $f_1$.

A further definition is made, and a power series approximation thereof is also given:

$$R(f_o + f_1, t) \triangleq \frac{|E_{in}|^2 H^2}{1 - a^2 - 2a\cos\psi_\Delta(f_o + f_1, t)} \simeq$$

$$\left[\frac{H^2}{(1-a)^2} - \frac{aH^2}{(1-a)^4}\psi_\Delta^2(f_o + f_1, t)\right]|E_{in}|^2$$

based on $\Psi_\Delta$ being of a small value. Here $R(f_o+s_1,t)$ represents the value of $I_d(f_o+f_1,t)$ for the situation described above in which $\phi_s = 2\pi$.

The foregoing definitions, and the small angle approximations $$\cos n\psi_\Delta \simeq 1 - \frac{n^2\psi_\Delta^2}{2}$$

$$\sin n\psi_\Delta \simeq n\psi_\Delta$$

permit writing the last equation for intensity of electromagnetic waves impinging on photodetector 22 as $$I_d(f_o + f_1, t) = R(f_o + f_1, t)[1 + 2W(t)(1 - \cos\phi_s) - 2X(t)(1 - \cos\phi_s) + Y(t)(1 - \cos\phi_s)\psi_\Delta^2(f_o + f_1, t) - 2Z(t)\sin\phi_s\psi_\Delta(f_o + f_1, t)]$$

This last equation is then altered to reflect the addition of the feedback loop involving reset modulation generator 50 by inserting therein the representation for the peak phase change $\phi_s(t)$ given above as $\phi_s(t) = 2\pi + \phi_\delta + \phi_a\sin\omega_u t = 2\pi + \phi_{s\Delta}(t)$. This insertion results in the following:

$$I_d(f_o + f_1, t) = R(t) + R(t)W(t)\phi_{s\Delta}^2(t) - R(t)X(t)\phi_{s\Delta}^2(t) + \tfrac{1}{2}R(t)Y(t)\phi_{s\Delta}^2(t)\Psi_\Delta^2(t) - 2R(t)Z(t)\phi_{s\Delta}(t)\Psi_\Delta(t)$$

Appropriate Fourier series representations are made to the time dependent factors in the last equation to separate the various frequency components represented therein. Substituting the values for $\phi_{s\Delta}$ and $\phi^2_{s\Delta}$, or $$\phi_{s\Delta}(t) = \phi_\delta + \phi_a\sin\omega_u t$$

$$\phi_{s\Delta}^2(t) = \phi_\delta^2 + \frac{\phi_a^2}{2} + 2\phi_\delta\phi_a\sin\omega_u t - \frac{\phi_a^2}{2}\cos 2\omega_u t$$

permits finding the frequency components of interest in this equation for the feedback loop based on reset modulation generator 50 controlling the amplitude reset value of the serrodyne wave provided by doubly controlled serrodyne generator 26'. These frequency components of interest, that is, those having the frequency value $f_u$ therein, are then selected by filter 54 to be provided at the output thereof. For $\Psi_b < 1$, as indicated above, the resulting frequency component at frequency $f_u$ is found to be $$v_{54} = \frac{|E_{in}|^2 H^2 \omega_1 \phi_\delta \phi_a \tau G_2 \sin\omega_u t}{2\pi(1-a)^2 \ln a}$$

The constant $G_2$ represents the effective gain of photodetector 22, photodetector signal processing and bias circuit 24, and filter 54.

The output signal of filter 54 then is provided to the signal input of phase detector 56 for demodulation in that phase sensitive detector, which detector will have an output signal following a discriminant characteristic over frequency suitable for operating as the error signal source for the remainder of the feedback loop. This phase detector output signal is given by $$v_{56} = G_3 \int_0^{T_u} v_{54} \sin \omega_u t \, dt$$

The constant $G_3$ represents the effective gain of photodetector 22 and photodetector signal processing circuits 24, filter 54 and phase sensitive detector 56. The time period $T_u = 2\pi/\omega_u = 1/f_u$ is the period of the modulation due to reset modulation generator 50. Clearly, the output of phase sensitive detector 56 depends directly on the magnitude and sign of the deviation of the serrodyne wave from $2\pi$, or $\phi_\delta$. Thus, if the feedback loop forces this parameter to a value of zero, this error signal will also take the value zero as it should in that circumstance.

The system of FIGS. 2A and 2B uses two serrodyne generators, 26' and 27', the difference in their frequencies during operation of the system of FIGS. 2A and 2B being a measure of the rotation rate of resonator 10 about its axis perpendicular to the plane containing its optical fiber coil. This arrangement of two serrodyne generators has the advantage of just requiring measuring differences occurring in serrodyne frequencies rather than the very low value serrodyne frequencies expected for close to zero rate rotations of resonator 10 if a single serrodyne generator is used.

Figure 3A:
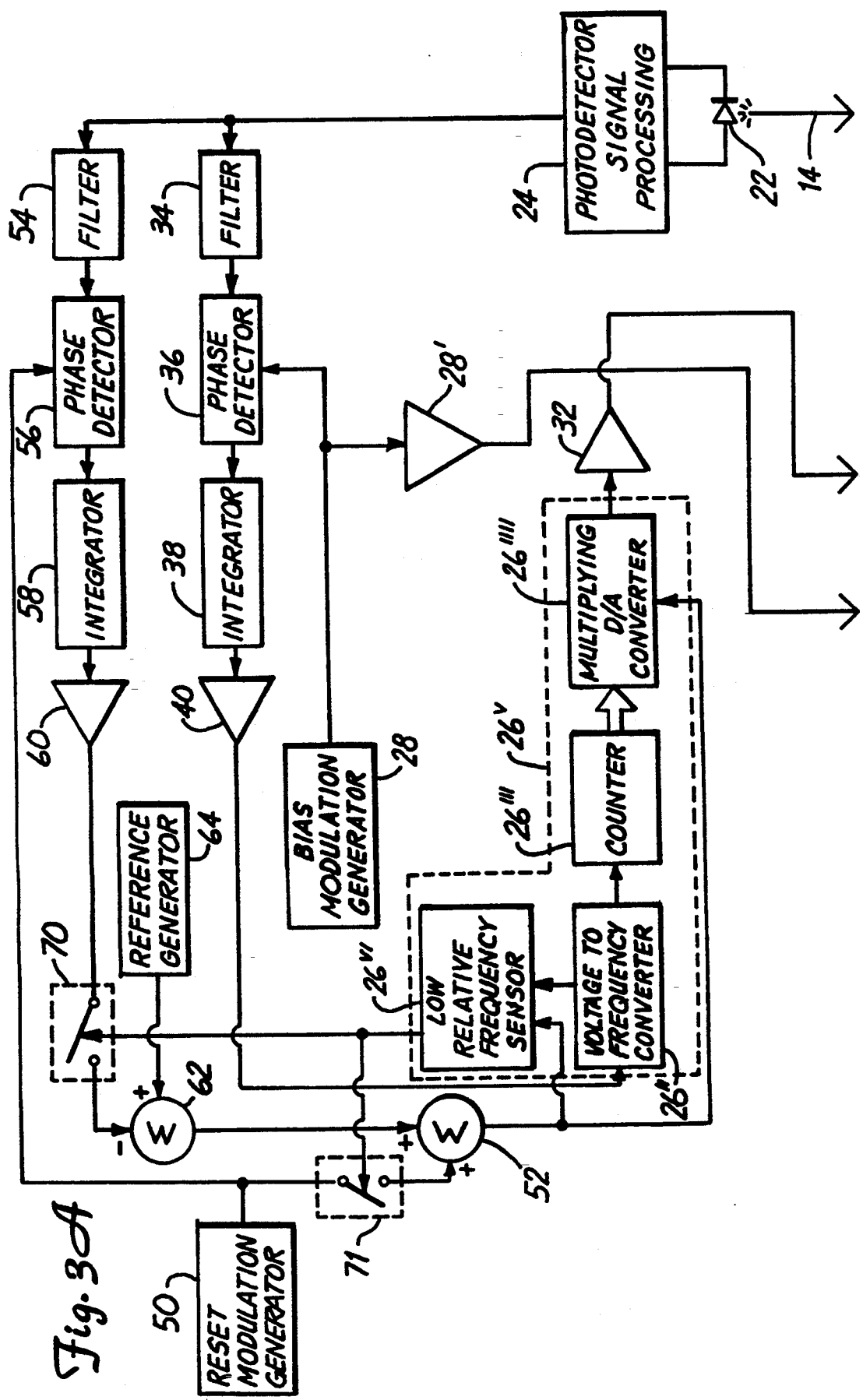
FIGS. 3A and 3B show a system schematic diagram of another resonator fiber optical gyroscope system also embodying the present invention combining a signal processing arrangement and an optical transmission path and device arrangement.
Figure 3B:
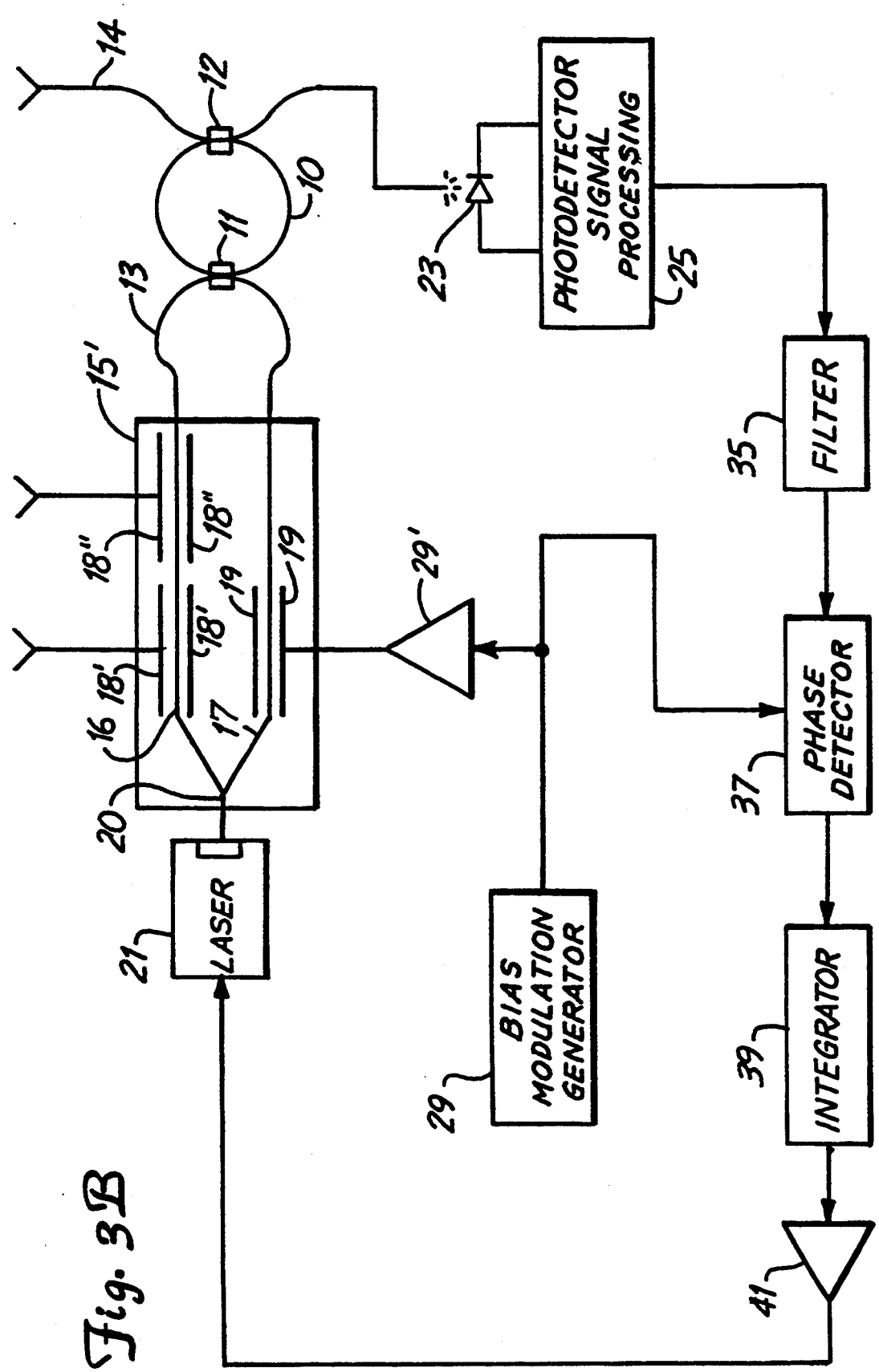

However, in many instances there is enough "noise" in the gyroscope system so that the actual serrodyne generator frequencies in a single serrodyne system never approach zero but instead maintain a fairly convenient frequency level which has an average approaching zero for rotation rates approaching zero. Thus, a resonator fiber optic gyroscope system can be operated with a single serrodyne generator, as shown in FIGS. 3A and 3B, and such a system has been shown to reduce bias errors at a zero rotation rate, but at the expense of somewhat greater scale factor errors at other rotation rates. In that figure, components which are similar to those in FIG. 1 and FIGS. 2A and 2B retain the same designations as were used in those earlier figures.

As can be seen in FIGS. 3A and 3B, controlled serrodyne generator 27' of FIG. 2B is no longer present in that system. Hence, the output rotation rate measured by that system is represented by the frequency of the output serrodyne waveform provided by the remaining serrodyne generator now redesignated 26$^v$. This redesignation has been made because of the addition of a control capability in that generator as will be described below. The equations presented previously herein characterizing the systems previously described essentially characterize the system of FIGS. 3A and 3B also. Thus, that characterization also represents the added feedback loop involving reset modulation generator 50 for controlling the values of reset phase amplitude deviations from the desired value $2\pi$ in serrodyne generator 26$^v$.

The absence of a second serrodyne generator means that there is no frequency addition in the optical integrated circuit to the frequency of the output electromagnetic waves of laser 21 as there was in the system of FIGS. 2A and 2B. Hence, the frequency of the output electromagnetic waves of laser 21 is again $f_o$, and this is the frequency of the primary clockwise electromagnetic waves in resonator 10. The frequency of the output electromagnetic waves of laser 21 must again provide resonance in the clockwise direction in resonator 10 at frequency $f_o$, and the output frequency $f_o$ is maintained at such a value in the system of FIGS. 3A and 3B as it was in the system of FIGS. 2A and 2B by a feedback loop starting the output optical fiber 14 and photodetector 23.

On the other hand, the presence of serrodyne generator 26$^v$ does again supply a frequency shift $f_1$ to the frequency of the electromagnetic waves supplied from laser 21 in the optical integrated circuit to provide a counterclockwise electromagnetic wave in resonator 10 having a primary frequency of $f_o + f_1$. This value is maintained again in a feedback loop beginning with output fiber 14 and photodetector 22 with photodetector signal processing electronics 24 providing a signal to filter 34. Both of the remaining portions of these two feedback loops of FIGS. 3A and 3B operate just as they did in FIGS. 2A and 2B with bias modulation generator 28 providing a sinusoidal bias signal at frequency $f_m$ for the feedback loop involving serrodyne generator 26$^v$, and bias modulation generator 29 providing a sinusoidal output signal at frequency $f_n$ for the feedback loop involving laser 21. A signal from bias modulation generator 28 is again supplied to phase detector 36, and to an amplifier, 28', which supplies an amplified signal to the optical integrated circuit now redesignated 15'. Similarly, bias modulation generator 29 provides an output signal again to phase detector 37 and to an amplifier, 29', which in turn provides an amplified signal to optical integrated circuit 15'.

Optical integrated circuit 15' has had a redesignation in FIG. 3B because of the use there of two phase modulators, 18' and 18", in place of single phase modulator 18 which was used in the system of FIGS. 2A and 2B, although the arrangement of FIGS. 2A and 2B involving a single phase modulator could again have been used in the system of FIGS. 3A and 3B. Phase modulator 18' is directly driven by an amplifier, 28', for bias modulation purposes, and phase modulator 18" is driven by amplifier 32 directly from serrodyne generator 26' for frequency shifting purposes. As a result, summer 30 of FIG. 2A is eliminated. In addition, phase modulator 19 is driven by amplifier 29', but with the absence of a second serrodyne generator there is no need for summer 31. The addition formerly provided by summer 30 is effectively provided by the two phase modulators 18' and 18" positioned sequentially along integrated waveguide 16 in optical integrated 15'.

As indicated above, the use of a single serrodyne generator 26$^v$ leads to relatively low frequency serrodyne waves being provided thereby as the rotation rate approaches zero. This also leads to a lower value in these circumstances for the error signal in the feedback loop involving reset modulation generator 50 providing a sinusoidal output wave at frequency $f_u$. For serrodyne frequencies down near the "noise" rate occurring as the rotation rate goes to zero, the error signal supplied in that feedback loop will be so small as to result in possible stability problems for the loop.

Avoidance of such stability problems is provided in the system of FIGS. 3A and 3B by the addition of a pair of switches, 70 and 71. Each of these switches is operated by a relative small frequency difference sensor, $26^{v'}$, or low frequency sensor, which senses when the difference between the serrodyne frequency $f_1$ and the reset modulation generator frequency $f_u$ becomes too small. At that point, switches 70 and 71 are opened to remove the effects of the feedback loop controlling $\phi_s$, involving the signals from reset modulation generator 50, from having any effect on serrodyne generator $26^v$, while allowing the nominal $2\pi$ reference value from reference generator 64 to continue to be provided to multiplying digital-to-analog converter $26''''$.

Such a disconnection of the feedback loop controlling $\phi_s$ will, of course, leave the errors resulting from $\phi_s \neq 2\pi$ to occur without any means provided to counteract such errors. Thus, the intensity of the electromagnetic waves impinging on photodetector 22 for a serrodyne wave of frequency $f_1$ with a maximum phase change therein of $\phi_s$, absent any corrective action provided by the added feedback loop involving reset modulation generator 50 for controlling $\phi_s$ now disconnected, is again just that found for the system of FIG. 1, or $$I_d(f_o + f_1, t) = \frac{|E_{in}|^2 H^2}{1 + a^2 - 2a\cos\psi} \{1 + 2a^{2n}(1 - \cos\phi_s) -$$

$$2a^n[(1 - \cos\phi_s)\cos n\psi + \sin\phi_s \sin n\psi]\}$$

An analysis of this last equation similar to that used in determining the error signal at the output of filter 54 in the disconnected feedback loop for controlling $\phi_s$ can again be used to determine the resulting error signal at the output of filter 34 in the feedback loop controlling $f_1$ resulting from the disconnection of this $\phi_s$ loop. Such an analysis yields the following error signal at the output of that filter after a phase reset $\phi_s$ in the serrodyne waveform if $\phi_s \neq 2\pi$ so that $\phi_\delta \neq 0$:

$$v_{54} = -G_4 \left\{ \frac{2a\psi_b H^2}{(1-a)^4} (\psi - \psi_\Delta) + \left[ \frac{t-t_o}{\tau} a^{\frac{(t-t_o)}{\tau}} \right] \frac{H^2[(1-a)^2 - a\psi_b^2]\phi_\delta \psi_b}{(1-a)^4} \right\} \sin\omega_m t$$

where $G_4$ represents the accumulated effective gain constants of photodetector 22, photodetector signal processing and bias circuit 24, and filter 34.

This error signal $v_{34}$ in the serrodyne frequency $f_1$ control feedback loop, occurring after each reset in the serrodyne waveform at a corresponding $t_o$ where $\phi_s \neq 2\pi$, has two terms inside the braces with the first term, or the term on the left, being zero when the counterclockwise electromagnetic wave in resonator 10 is in resonance. If $\phi_\delta$ is not zero in the term on the right because $\phi_s \neq 2\pi$, this second term will have an initial and transient value with the result that the serrodyne frequency control feedback loop will adjust the frequency of the counterclockwise wave away from resonance to result in the sum of the two terms in the braces of the expression for $v_{34}$ having a time average of zero, i.e. the error signal must average zero over time in the feedback loop. Thus, the result will be the first term taking on a balancing value if the second term has taken a value due to a reset. Therefore, the time average rate error due to $\phi_s \neq 2\pi$ will depend on the time average of the second term.

At times when the feedback loop for controlling $\phi_s$ has been disconnected, the time average of the second term will depend linearly on the rotation rate. This is true because, during an arbitrary averaging time much greater than the period of frequency $f_1$, there will be fewer and fewer occurrences of the second term due to fewer and fewer serrodyne phase resets for rotation rates going lower and lower, and because the equation for $v_{34}$ shows that the value of the second term damps out relatively quickly with respect to the length of the period of the serrodyne frequency $f_1$ at relatively low rotation rates. Such relative rapid damping of the second term in the braces of the expression for $v_{34}$, or the term on the right, generated by $\phi_\delta$ having a value due to $\phi_s \neq 2\pi$ comes about because of the first two factors in that term on the right. These two factors together can be shown to have initially, after a phase reset $\phi_s$ of the serrodyne waveform, an increasing value with time for a short duration after which it rapidly decreases to become insignificantly small within a single period of the bias modulation signal frequency $f_m$. Thus, rate errors in this operation mode will depend linearly on the rotation rate.

On the other hand, for higher rotation rates so the feedback loop controlling $\phi_s$ is connected, the rate error will be approximately a constant value independent of the rotation rate. This is because $\phi_\delta$ in the second term of the expression for $v_{34}$ is not constant for this mode of operation and varies proportionally with the inverse of the rotation rate due to better control of $\phi_s$ for higher rotation rates. Thus, for higher and higher rotation rates, increases in the time average of the first two factors of the second term are balanced by decreases in $\phi_\delta$; therefore, the time average of the entire second term is independent of the rotation rate. Hence, the optimum value of the serrodyne output signal frequency $f_1$, relative to the bias modulation signal frequency $f_m$, at which the feedback control loop for controlling $\phi_s$, associated with feedback modulation generator 50, should be connected and disconnected is the frequency at which the rotation rate error is the same for that loop being connected and disconnected (a typical $f_m$ value would be 20 kHz). Typically, this might occur at a serrodyne frequency of $f_1 = 200$ Hz, or 1% of $f_m$.

Thus, for those rotation rates of resonator 10 about its axis at which the feedback loop controlling $\phi_s$ is connected, the scale factor error—based on the fraction that the rate error is of the actual rate—decreases linearly with increasing rotation rates of coil 10 because the rotation rate error at those rotation rates is a constant. In the opposite situation where this feedback loop is disconnected, the scale factor error is constant with rotation rate because the rotation rate error is decreasing linearly with decreasing rotation rates. As a result, the maximum scale factor error due to serrodyne reset amplitude error will occur in the situation in which this $\phi_s$ feedback loop is disconnected if the above-indicated optimum serrodyne frequency is chosen for connecting and disconnecting this feedback loop.

In situations where higher accuracy from the resonator fiber optic gyroscope is required, the added errors at lower rotation rates due to $\phi_s \neq 2\pi$ which come about because of the disconnecting of the feedback loop for controlling $\phi_s$ may not be tolerable. Such errors can be reduced or eliminated by eliminating, from the error signal used in controlling doubly controlled serrodyne generator $26^v$, those portions thereof occurring during those cycles of the bias modulation signal of frequency $f_m$, provided by bias modulation generator 28, in which phase reset changes $\phi_s$ occur in the serrodyne waveform provided by doubly controlled serrodyne generator $26^v$.

Since lower rotation rates of resonator 10 about its axis will result in the serrodyne generator waveform frequency $f_1$ having values smaller than the value of the bias modulation generator waveform frequency $f_m$, there will be fewer serrodyne waveform resets per any arbitrary number of modulation periods of the bias modulation waveform. And since, as indicated above, the error signal arising from a serrodyne waveform reset will damp out in less than the duration of a period for the frequency $f_m$ of the bias modulation signal provided by bias modulation generator 28 (again, a typical $f_m$ value being 20 kHz), there will only be a fraction of the cycles of the waveform of the signal from bias modulation generator 28 in which a serrodyne waveform reset $\phi_s$ occurs that could result in erroneous information in the corresponding portions of the error signal from filter 34 supplied to integrator 38 through phase detector 36 to control doubly controlled serrodyne generator $26^v$. During the remaining cycles of the bias modulation generator output signal waveform, the portions of the error signal from filter 34 corresponding thereto will be virtually free of error from the effects of the serrodyne signal phase resets. Thus, if this erroneous information in the error signal provided to doubly controlled serrodyne generator $26^v$ is eliminated, or "blanked" out, at each reset $\phi_s$ of the serrodyne waveform during the corresponding bias modulation cycle, essentially only error-free information will then accumulate in integrator 38 to control doubly controlled serrodyne generator $26^v$.

Figure 4A:
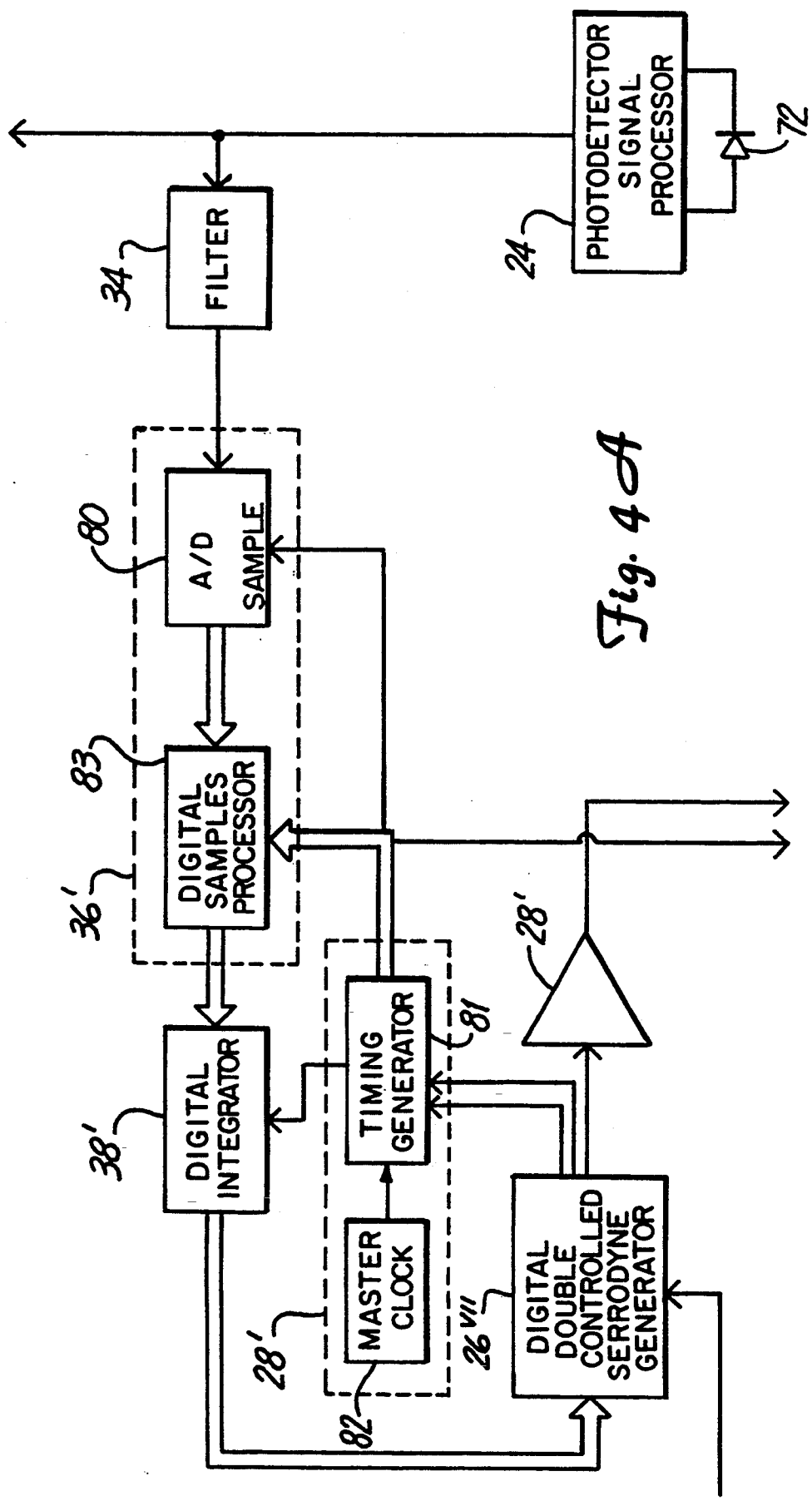

Providing such a blanking operation requires that the feedback loop for controlling the frequency $f_1$ of the serrodyne output signal from doubly controlled serrodyne generator $26^v$ be modified from the system shown in FIG. 3A to that shown in FIG. 4A. In addition, this blanking capability is shown implemented in FIG. 4A to a substantial degree in digital form, an implementation form which can be provided for other feedback loops described herein. The feedback loop for controlling $\phi_s$ will again be disconnected at a selected value for serrodyne frequency $f_1$, i.e. for a sufficiently low rotation rate of resonator 10 about its axis, substantially by the means shown in FIG. 3A. The blanking operation in this arrangement is typically begun at a value of $f_1$ equal to the value $f_1$ at which the loop controlling $\phi_s$ is disconnected, although not necessarily so.

Again, the blanking operation must be removed as the serrodyne signal waveform frequency $f_1$ approaches the bias modulation frequency $f_m$, or otherwise a very large fraction of the error signal from filter 34 would be blanked out, finally eliminating any error signal otherwise intended to be used in controlling doubly controlled serrodyne generator $26^v$. Typically, the frequency at which the blanking operation is eliminated, and at which the loop for controlling $\phi_s$ is reconnected, in a resonator fiber optic gyroscope system using this blanking feature will be greater than the frequency in a similar gyroscope system in which the feedback loop for controlling $\phi_s$ is merely removed without any provision of a blanking feature. Therefore, the maximum scale factor error will typically be less for a resonator fiber optic gyroscope system using such a blanking feature.

The choice of the optimum value of the serrodyne waveform frequency $f_1$, as a fraction of the bias modulation frequency $f_m$ below which the blanking operation is engaged for lower values of $f_1$ and above which it is eliminated in favor of the feedback loop for controlling $\phi_s$, again involves a trade-off between error sources. Above this optimum frequency with the blanking operation eliminated, scale factor errors due to $\phi_s \neq 2\pi$ during the serrodyne waveform resets become increasingly significant leading to the need for connecting the feedback loop for controlling $\phi_s$. Below the optimum frequency, the increased number of blanking occurrences for higher values of $f_1$ approaching the optimum frequency will, as indicated above, result in reducing the error signal relative to the noise occurring therewith which is applied to integrator 38 for use in controlling the value of frequency $f_1$ of the serrodyne output signal provided by doubly controlled serrodyne generator $26^v$.

Typically, the resonator fiber optic gyroscope will have an output signal, set by the error signal for use in controlling the frequency $f_1$ of doubly controlled serrodyne generator $26^v$, will have a noise performance that will appear to be limited by a source of white noise such as the shot noise at photodetector 22. As a result, the rotation-equivalent random noise of the gyroscope will increase as the square root of decreases in the value of this signal such as due to blanking. For example, if that signal decreases by a factor of 2 due to blanking half of it out, the random noise will increase by $\sqrt{2}$. Hence, raising the frequency at which the blanking operation is eliminated raises the maximum fraction of the signal that will be blanked out and so increases the effects of random noise at the corresponding higher rotation rates.

In the other direction, values of frequency $f_1$ below this optimum frequency result in less loss of error signal due to the blanking feature, but also result in poorer control of $\phi_s$ by the feedback loop therefor because of the relatively small error signal developed over such longer periods in $f_1$. This situation is indicated in the expression for the signal obtained from filter 54 for forming the discriminant in the feedback loop for controlling $\phi_s$ where $v_{54}$ was shown to depend directly on $\omega_1 = 2\pi f_1$. Hence, the lower the value of $f_1$ at which the blanking feature is engaged the better the performance required of the feedback loop for controlling $\phi_s$ to obtain a desired scale factor performance because of the smaller signals occurring therein.

As a result of the foregoing considerations, the value of $f_1$ where changes from the blanking operation mode to the $\phi_s$ control loop operation mode should be as high as possible short of causing unacceptable random noise errors. Typically, this changing point value of the serrodyne signal frequency $f_1$ should be set at anywhere from 25% to 75% of the bias modulation signal frequency value $f_m$.

In the modified system of FIG. 4A to permit a blanking operation mode, filter 34 operates just as it did before in FIG. 3A to select and pass error signal components at frequency $f_m$ to phase detector that is now shown with a specific digital implementation and so redesignated 36'. Phase detector 36' has an input analog-to-digital converter, 80, to receive the output signal $v_{34}$ from filter 34. Frequency $f_m$, of course, is the frequency of the sinusoid provided by the bias modulation generator for operating phase modulator 18' in integrated optic circuit 15' in FIG. 3B.

As shown in the expression above for $v_{34}$ giving the error signal following each reset $\phi_s$ in the serrodyne waveform that, except for a transient error due to a phase reset in which $\phi_s \neq 2\pi$ that never lasts more than about one period of the frequency $f_m$, there will only be a signal component at $f_m$ provided by filter 34 when the counterclockwise electromagnetic wave in resonator 10 is off resonance. Any such off-resonance error signals are sampled and digitized by analog-to-digital converter 80 which is directed to take such samples at the occurrences of maximum values and minimum values of any error signal sinusoid presented at frequency $f_m$, the initiation of such sampling at the times of the extremes of any such error signal sinusoid by analog-to-digital converter 80 being directed by signals from timing circuits provided in the bias modulation generator which has been redesignated 28' in FIG. 4A because of additional capabilities provided therein to be described below.

The presence of such a signal at the input of analog-to-digital converter 80 is detected by subtracting the values of the samples taken thereby occurring at a minima in the error signal sinusoid from the values of the samples taken occurring at an adjacent maxima of that same sinusoid, i.e. subtracting the samples from the low peak in the error sinusoid from those of the high peak in a cycle of the error signal sinusoid of frequency $f_m$. Ignoring the transient situation due to a $\phi_s$ reset, if the counterclockwise electromagnetic wave in resonator 10 is at resonance, there will be no signal at the output of filter 34 so that the subtracting of value samples taken when a minimum should have occurred were such a signal present from the values of the samples of the adjacent maximum were there such a signal present will yield zero, and thus there will be no contribution to an error accumulation in the integrator following phase detector 36', this integrator being redesignated 38' in FIG. 4A because of it being provided in a specific digital implementation.

On the other hand, if the counterclockwise electromagnetic wave in resonator 10 is off the center of resonance peak, an error signal sinusoid of frequency $f_m$ will be passed by filter 34 to analog-to-digital converter 80. In these circumstances, the subtraction of the samples at the minimum of that error signal sinusoid from the values of the samples at the maximum of that error signal sinusoid will yield non-zero values, the algebraic sign of which depends on the phase of the signal relative to the time of sampling. Such non-zero difference values will then be passed to digital integrator 38' to be accumulated therein over time. The resulting time average of these differences is the basis for the integrator output signal to be used in the controlling doubly controlled serrodyne generator which has been redesignated 26''' in FIG. 4A because of its specific partial digital implementation shown there. The value of the frequency of the serrodyne generator output signal $f_1$ is thereby adjusted to result in eliminating the signal provided at the output of filter 34 so as to force the counterclockwise electromagnetic wave in resonator 10 to be at resonance in the absence of $\phi_s$ reset induced errors.

In obtaining a satisfactory signal-to-noise ratio with the sampled error signal sinusoid, analog-to-digital converter 80 is directed to take a number of samples of that error signal sinusoid at its peak, high or low, in each half cycle of the bias modulation generator output signal of frequency $f_m$. The time separation chosen between such samples is based on a condition that adjacent samples have little statistical correlation in value with one another since any more frequent sampling would have little effect on the signal-to-noise ratio.

The sampling is done synchronously with the bias modulation output signal so that those frequencies sufficiently near to $f_m$ to also pass through filter 34 will be rejected. This occurs because the results of subtracting the values of the samples at the minima from those at the maxima of other such sinusoids which are asynchronous with the error signal sinusoid at frequency $f_m$ will average to zero over time.

Signals which occur in quadrature phase with $f_m$ will, of course, also pass through filter 34, there being various sources of such signals such as intensity modulation occurring in integrated optic circuit 15'. These quadrature phase signals are also rejected because the phase of the sampling is set to be in quadrature therewith.

Analog-to-digital converter 80 is typically of the "flash" converter type. The conversion accuracy is necessary to achieve by having the converter provide output digital values of eight bits in 2's complement arithmetic form. The timing signal provided to analog-to-digital converter 80 from bias modulation generator 28' comes from a timing generator, 81, therein which receives a time base signal from a master clock, 82, also part of bias modulation generator 28'. Timing generator 81 also supplies timing signals to the remainder of digital phase detector 36' which is a digital samples processor, 83, that receives the digitized samples from analog-to-digital converter 80. Digital samples processor 83 then provides the results of its manipulations with these samples to digital integrator 38' to average them over time for control of digital doubly controlled serrodyne generator 26'''.

Figure 4B:
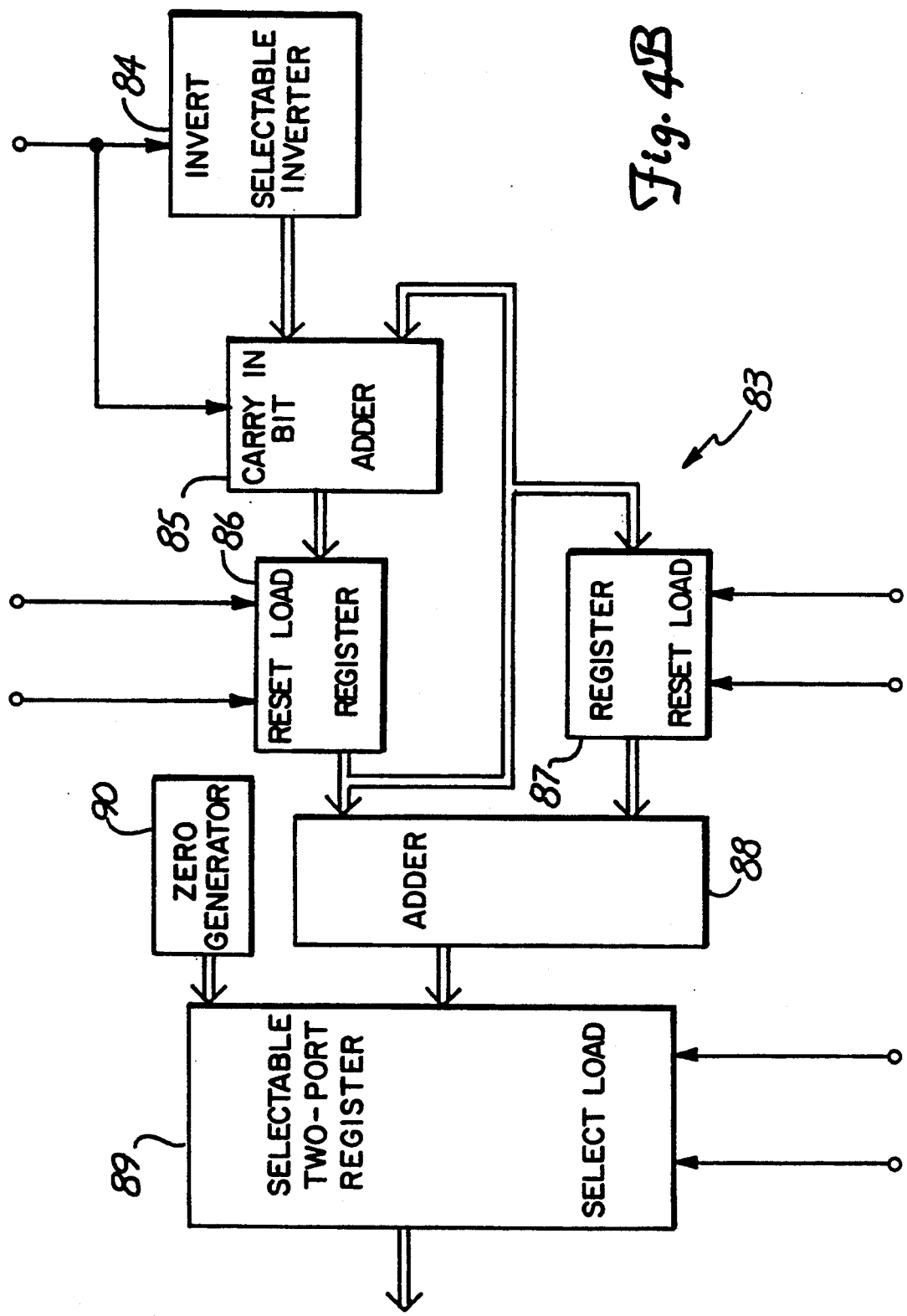
Figure 4C:
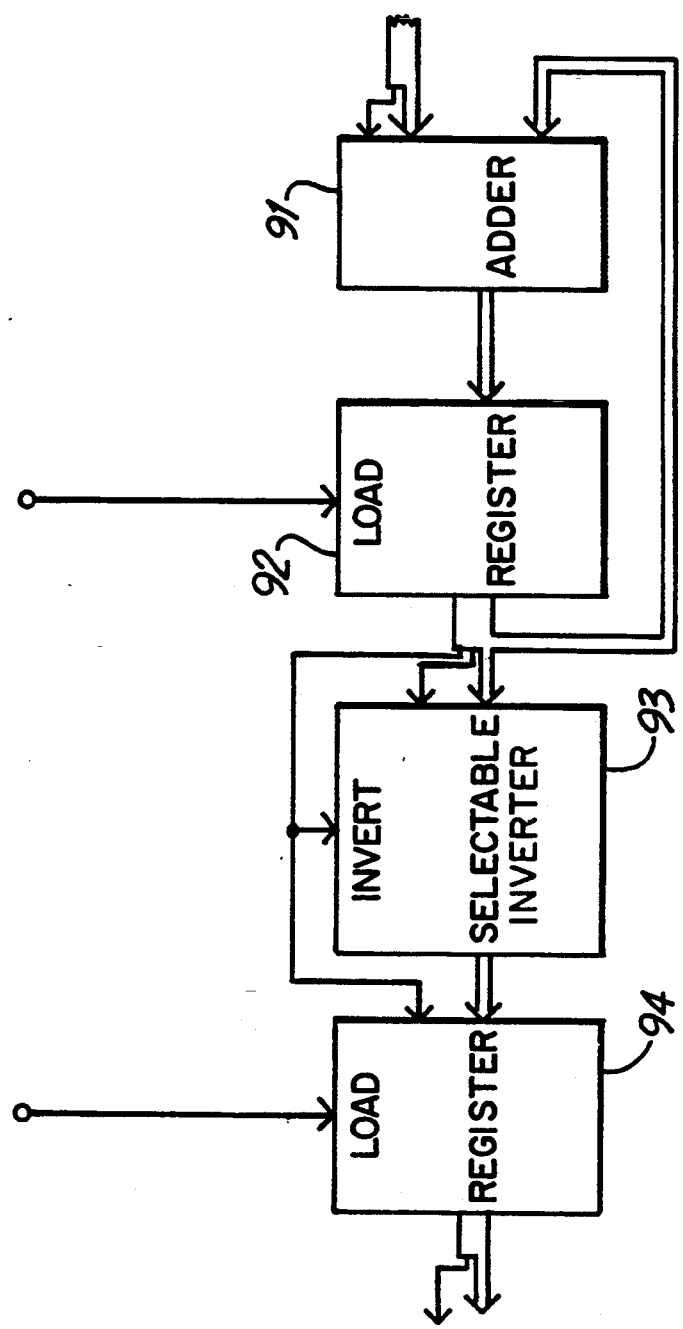
Figure 4E:
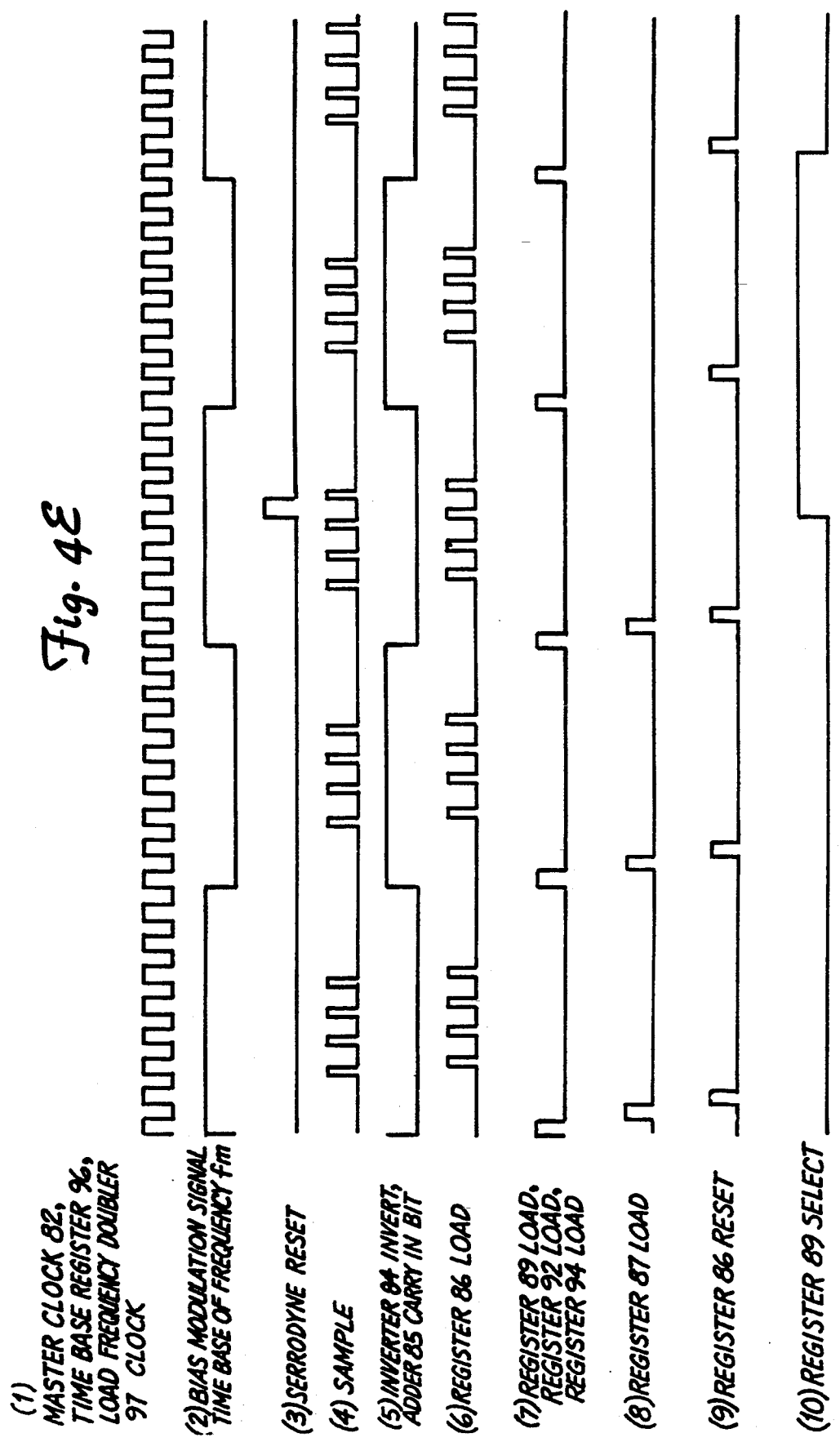

FIG. 4B shows a system schematic diagram of digital samples processor 83, FIG. 4C shows a system schematic diagram of digital integrator 38', and FIG. 4D shows a system schematic diagram of the digital portion of digital doubly controlled serrodyne generator 26'''. Finally, FIG. 4E shows a timing signal diagram of the various signals provided by timing generator 81 and master clock 82. A logic design for timing generator 81 can be easily provided by one skilled in digital design using the time base signal provided by master clock 82, an oscillatory device also based on well-known digital design principles.

In the timing signal diagram of FIG. 4E, the uppermost, or first, waveform represents the time base, or the high frequency rectangular wave, provided by master clock 82 of FIG. 4A. The frequency of this clock is inadequately represented in FIG. 4E as it is of much higher value relative to the frequencies occurring in the other timing signals shown in that figure. Typically, the time base frequency would be a thousand times greater than frequency $f_m$ provided as a bias modulation signal to operate phase modulator 18' in integrated optic circuit 15' of FIG. 3B. However, graphical depiction limitations lead to presenting just the illustrative waveform shown as this first waveform in FIG. 4E.

A bias modulation signal time base is obtained in timing generator 81 from the master time base signal provided by master clock 82. This signal is the second waveform shown in FIG. 4E, and this version of the signal is supplied to filtering electronics and the like in timing generator 81 to result in a sinusoidal signal of frequency $f_m$ for use with phase modulator 18' in integrated optic circuit 15' of FIG. 3B. As a result, that bias modulation output signal to operate phase modulator 18' has a selected phase relationship with the bias modulation signal time base shown in this second waveform in FIG. 4E.

The third signal waveform shown in FIG. 4E shows a single pulse in a succession thereof provided by digital doubly controlled serrodyne generator $26^{\nu''}$, one being provided each time this generator initiates a phase reset $\phi_s$ in forming the approximate serrodyne waveform provided at the output thereof. Since blanking mode operation is used only when the frequency $f_1$ of the serrodyne output signal wave has decreased a significant amount below the frequency $f_m$ of the bias modulation signal, the value of the frequency $f_1$ of the serrodyne signal is assumed to be sufficiently small with respect to the frequency $f_m$ of the bias modulation signal so that only a single reset is shown in the time duration of the signals depicted in FIG. 4E.

The fourth waveform in FIG. 4E is a sampling waveform which is used to direct analog-to-digital converter 80 as to the proper times in which it is to sample the output signal provided by filter 34. As previously indicated, these samples are to be taken near the maxima and minima of the error signal sinusoid that occurs at the output of filter 34 during those situations in which an out-of-resonance condition develops for the counter-clockwise electromagnetic wave in resonator 10. As can be seen from this fourth waveform, four samples are shown as an example to be taken near the midpoint of the half cycles of the bias modulation signal time base at frequency $f_m$ shown in the second waveform of FIG. 4E, these midpoints being where the maxima and minima of error signal sinusoids are expected to occur since such sinusoids also have a frequency of $f_m$.

The samples taken by analog-to-digital converter 80 are provided to digital samples processor 83 in phase detector 36'. Digital samples processor 83 is shown in greater detail in FIG. 4B where the samples, entering on the right, are shown to be provided to a selectable inverter, 84. Selectable inverter 84 receives a timing logic signal at its invert input, supplied by timing generator 81 to digital samples processor 83, directing it when to, and when not to, invert the 2's complement value of the samples received which is shown as the fifth waveform in FIG. 4E.

In the arrangement shown, digital values of the samples at each minimum in any error signal sinusoids provided by filter 34 are received and inverted by selectable inverter 84, and digital values corresponding to the samples taken at each of the maximums are transmitted as they are received without any inversion. The frequency of the fifth waveform is again $f_m$ and represents merely a logical complement of the second waveform in FIG. 4E providing the bias modulation signal time base.

These alternately inverted and uninverted sets of digital values of samples taken at corresponding ones of alternating and succeeding minima and maxima, respectively, of any error signal sinusoid provided by filter 34 are additively accumulated in the accumulator in digital samples processor 83. The output of selectable inverter 84 is supplied to one input port of an adder, 85, which together with a register, 86, forms that accumulator though having the output of register 86 connected to the remaining input port of adder 85 in a feedback arrangement. The fifth waveform also provides a carry-in bit for adder 85 for its addition operations. The cumulative loading of sample values taken at a maximum or at a minimum of the error signal sinusoid into register 86 in this accumulator is controlled by the register 86 loading signal shown in the sixth waveform in FIG. 4E.

However, this accumulator is reset to zero by a timing pulse to the reset input of register 86 at the end of each half cycle of the bias modulation signal time base, i.e. at the end of the accumulation of samples for any given maximum or minimum occurring in an error signal sinusoid provided by filter 34. As a result, this accumulator, after each half cycle of the error signal sinusoid at frequency $f_m$ or each half cycle of the bias modulation signal time base of the same frequency, holds the accumulated value of all of the samples taken for a particular maximum or minimum in register 86. This effectively represents the average value of the samples for the maximum or minimum of the error signal sinusoid for that half cycle, although it actually represents this average times the number of samples taken.

Before register 86 is reset, i.e. cleared or set to a value of zero, however, an accumulated effective average therein is also loaded into a further register, 87. Of course, before this loading of register 87, the contents of register 87 were just the effective average value that remained from the preceding maximum or minimum. Thus, register 86, after obtaining the effective average value for the current maximum or minimum, supplies that effective average value for the current maximum or minimum to an input port of another adder, 88. Since register 87 at that time, before the loading therein of the effective average value for the current maximum or minimum from register 86, supplies the effective average value of the immediately preceding minimum or maximum to the other input port of adder 88, and since the contents of one of registers 86 and 87 has the effective average value stored therein of inverted samples because of the action of selectable inverter 84, these two registers together at that time hold the effective difference between these effective average values of an adjacent pair of maximum and minimum in an error signal sinusoid. Thus, adder 88, by adding together these effective average values, provides in effect that difference therebetween at its output.

This process is repeated for each successive paired maximum and minimum, and the resulting succession of differences of effective average values of samples of succeeding paired maximums and minimums in any error signal sinusoid received from filter 34 are in turn is supplied to an input port of a selectable two-port register, 89. Each such effective difference value is then loaded into selectable two-port register 89 at that port to subsequently be provided at the output thereof in most, but not all, instances.

In FIG. 4E, the seventh waveform is the load signal for selectable two-port register 89, and pulses therein can be seen to occur after each loading of a serial set of the sample values into register 86 of the input accumulator of phase detector 36'', each serial sample set obtained by analog-to digital converter 80 in each half cycle of the bias modulation signal time base and about a corresponding extremum of any error signal sinusoid presented thereto. The eighth and ninth waveforms represent, respectively, pulses directing (a) the loading of register 87 to pass each current effective average samples value thereto from register 86 to thereby become the next previous effective average samples value, and (b) the resetting thereafter of register 86 to a zero value, a pulse in each of these waveforms occurring after each half cycle of the bias modulation signal time base or after each extremum in any error signal sinusoid present at the output of filter 34 except for the register 87 load signal in a blanking cycle as will be described below.

If a phase reset $\phi_s$ occurs in the serrodyne output signal provided by digital doubly controlled serrodyne generator 26$^{v\prime\prime}$ during a half cycle of the bias modulation signal time base at frequency $f_m$, or during a corresponding half cycle of an error sinusoid 10 provided at the output of filter 34, also at frequency $f_m$, the average value of the samples taken at a maximum or a minimum in that half cycle of the error signal sinusoid will be erroneous if $\phi_s \neq 2\pi$. As a result, the differences in the effective averages in the corresponding adjacent maximum and minimum will also be erroneous. The blanking feature is then invoked in this system to prevent loading such erroneous effective average sample value differences for that corresponding adjacent maximum and minimum into selectable two-port register 89 by the signal represented in the tenth waveform of FIG. 4E supplied to the select input of register 89.

A blanking initiation signal pulse is supplied from digital doubly controlled serrodyne generator 26$^{v\prime\prime}$, at each $\phi_s$ phase reset in the bias modulation output signal provided thereby, to timing generator 81. This generator, in turn, effectively supplies these pulses to the select input of selectable two-port register 89, thereby directing that this register be loaded with whatever digital values are present during such times at the other port therein opposite to the one to which the output of adder 88 is connected. That other port has a zero value generator, 90, connected thereto so that a value of zero is entered on each such occurrence into selectable two-port register 89 to thereafter be passed on to digital integrator 38'. Thus, a zero value is transmitted to this integrator in these instances rather than the erroneous average value differences provided by adder 88 during those half cycles in which serrodyne output signal phase resets $\phi_s$ occur.

As a result, the error signal has the adjacent effective average samples differences removed from it during those half cycles of the bias modulation signal time base of frequency $f_m$ in which a serrodyne waveform phase reset $\phi_s$ occurs with each such difference replaced by a zero, and so there will be nothing added to the values accumulating in digital integrator 38' for those half cycles. Further, these erroneous adjacent effective average samples differences are also not loaded into register 87 because, as shown in the eighth waveform in FIG. 4E, the load pulse is omitted during blanking cycles of the bias modulation signal time base. As a result, the difference between extrema after a blanking cycle involve an extremum before and after that cycle of the bias modulation signal time base rather than adjacent extrema, but extrema not contaminated by errors due to $\phi_s$ phase resets. Hence, only error free information is provided by digital samples processor 83 concerning the effective average samples value differences for adjacent, or near adjacent, pairs of a maximum and a minimum in any error signal sinusoid provided by filter 34.

The succession of differences between effective average values of samples of successive pairs of a maximum and a minimum in any error signal sinusoid present are passed to digital integrator 38' where they are accumulated over time. If such effective differences do not average to a zero value over time, digital integrator 38' will provide an effective error signal to digital doubly controlled serrodyne generator 26$^{v\prime\prime}$.

FIG. 4C shows in more detail digital integrator 38', this succession of effective differences from register 89 being provided to one input port of an adder, 91, in digital integrator 38'. Adder 91 is part of an accumulator formed with a register, 92, the output thereof being fed back to the other port of adder 91 in forming this accumulator. The most significant bit of the effective difference samples supplied by register 89 to adder 91 is used to set the value of the unused bits in the port of adder 91, and so is shown broken out in the bus extending between register 89 and adder 91. Register 92 is directed to load the output values from adder 91 by the pulses in the seventh waveform shown in FIG. 4E previously used with register 89.

The output of the accumulator formed of adder 91 and register 92 is supplied through a further selectable inverter, 93, to another register, 94. Selectable inverter 93 is used because the numerically controlled oscillator, to be described below, in digital doubly controlled serrodyne generator 26$^{v\prime\prime}$ requires receiving only positive values, and so any negative values provided by register 92 must be inverted before being loaded into register 94. The two most significant bits from register 92 are not provided to the input of selectable inverter 93, but the most significant bit as the sign bit in the 2's complement representation of value is connected to the invert input thereof so that, when it indicates a negative algebraic sign, selectable inverter 93 is directed to invert the digital value at its input. The second most significant bit from register 92 is not used at all since the values represented will not be of a magnitude requiring its use. The always positive values resulting from selectable inverter 93 are then loaded into register 94. Again, pulses in the seventh waveform in FIG. 4E are used to control the loading of this register. In addition, the most significant bit from the digital values supplied by register 92 is also loaded into register 94.

The digital values in register 94 are then provided to digital doubly controlled serrodyne generator 26$^{v\prime\prime}$, in particular, to the input of a numerically controlled oscillator provided by one input port of an adder, 95, this oscillator formed by having the output of adder 95 connected to the input of a register, 96, the output of which in turn is connected to the other port of adder 95 in a feedback arrangement. Register 96 is loaded under the control of the master clock signal, or the first waveform in FIG. 4E which is the highest frequency clock in the system. In these circumstances, with the output digital values from register 94 that are provided to adder 95 missing the two most significant bits, the frequency of the alteration of logic states of the second most significant bit of register 96 will be proportional to the digital error signal value provided by register 94 in digital integrator 38'.

Since register 96 requires two clock cycles for each new output, the frequency of the second most significant bit therefrom will be halved from what it might otherwise have been, and therefore a frequency doubler, 97, is shown provided ahead of counter 26''' which is identical to the counter with that same designation in doubly controlled serrodyne generator 26$^v$ in FIG. 3A. Such a doubler need not be used, and some other multiple could alternatively be provided. The direction of the counting in counter 26''' is set by the most significant bit previously stored in register 94 and provided therefrom to the up/down input of counter 26'''. The output of counter 26''' is sent on to multiplying digital-to-analog converter 26'''' of FIG. 3A in the same manner as before, and the remainder of the system in that figure otherwise being the same in being used with the system portion shown in FIG. 4A. Not shown, the signal forming the third waveform in FIG. 4E, used to indicate a phase reset $\phi_s$ in the serrodyne waveform, is obtained from the signal provided by counter 26'''.

Thus, the system of FIG. 4A substituted for corresponding portions of the system shown in FIG. 3A will result in the system which can provide both the blanking operation mode at sufficiently low values of the serrodyne output signal frequency $f_1$ which are less than a selected frequency value, and feedback control of the amplitude of the phase shift resets $\phi_s$ at higher values of frequency $f_1$. The frequency value of $f_1$ at which the change is made is set in low frequency sensor $26^{v'}$ which supplies the appropriate signals to switches 70 and 71, and to timing generator 81 to implement whichever of these modes are proper for the current value of serrodyne frequency $f_1$.

Figure 5A:
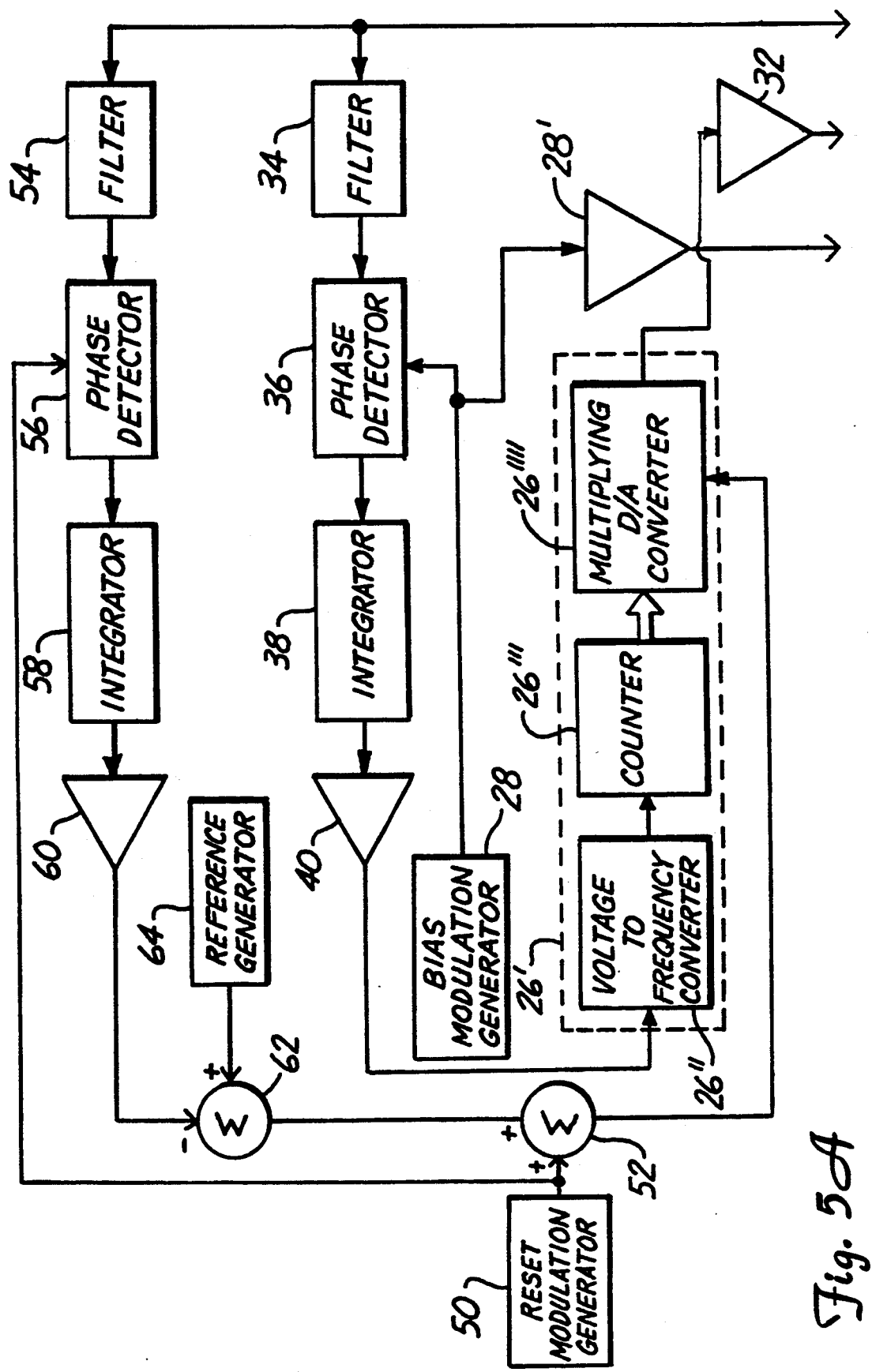

The system shown in FIGS. 2A and 2B, and FIGS. 3A and 3B, is often termed a "transmissive" resonator fiber optical gyroscope system. A "reflective" resonator fiber optical gyroscope system is another alternative which is shown in FIGS. 5A and 5B, and in which the deviations in reset phase amplitude of the serrodyne generator output waveforms are again controlled by corresponding feedback loops based on signals introduced by corresponding reset modulation generators. That is, reset modulation generator 50 again is used to introduce a modulation sinusoidal signal having a frequency $f_u$, and reset modulation generator 51 is again used to introduce a sinusoidal signal with a frequency $f_v$. These loops again operate much as they did for the system of FIGS. 2A and 2B. Components having similar functions in the system of FIGS. 5A and 5B as they had in the system of FIGS. 2A and 2B retain the same designations there that they had in FIGS. 2A and 2B.

The optical integrated circuit in FIG. 5B has been redesignated 15'' because phase modulator 19 of FIG. 2B has also been separated into two separate phase modulators, 19' and 19'', in FIG. 5B in the same manner as phase modulator 18 of FIG. 2B was separated into two modulators in FIG. 3B, and as it is again separated here. These two phase modulators 19' and 19'' operate in the same manner as do phase modulators 18' and 18'' first shown in FIG. 3B, and so will not be further described here.

The major difference in the "reflective" resonator fiber optical gyroscope system is that there is but a single coupler optically connecting resonator 10 with the remainder of the system. That is, a coupler designated 11,12 is shown in FIG. 5B which couples electromagnetic waves into resonator 10 from, and out of resonator 10 to, an external optical fiber, designated 13,14, serving as both the input optical fiber and the output optical fiber for the system. This is possible because of the use of two further optical couplers, 100 and 101, which couple electromagnetic waves from external optical fiber 13,14 to photodetectors 22 and 23, respectively. The outputs of these photodetectors are provided to the corresponding photodetector bias and signal processing circuits 24 and 25, respectively, which then provide signals to the same kind of feedback loop arrangements in FIGS. 5A and 5B as similarly designated photodetector bias and signal processing circuits do in the system of FIGS. 2A and 2B.

The major difference in operation here is that the electromagnetic waves reaching photodetectors 22 and 23 are not only those waves which have been circulating in resonator 10, but also the corresponding portions of the input electromagnetic waves which are not coupled into resonator 10 by optical coupler 11,12. Thus, there are two pairs of electromagnetic waves in external fiber 13,14 with each member of each pair following a different path than the other, and with each pair reaching a corresponding one of photodetectors 22 and 23. This leads to each pair member interfering with the other in that pair in impinging on the photodetector corresponding to that pair. That is, the electric field components of the electromagnetic waves reaching photodetector 22 can be represented as $$E_{d-22} = c_1 q E'_{in} + c_2 E_{ccw}$$

where $E_{d-22}$ represents the electric field component of the electrical magnetic waves reaching photodetector 22, $qE'_{in}$ in represents the input electromagnetic radiation provided through integrated waveguide 16, $E_{ccw}$ represents the counterclockwise electromagnetic waves which have been coupled back into external fiber 13,14 from resonator 10, and constants $c_1$ and $c_2$ represent the effects of various fractional couplings, losses, and phase delays on these electromagnetic wave components reaching photodetector 22.

Similarly, the electric field components of electromagnetic waves reaching photodetector 23 can be represented as $$E_{d-23} = c_3 q' E'_{in} + c_4 E_{cw}$$

with $E_{d-23}$ representing the electric field component of the electromagnetic waves reaching photodetector 23, $q'E'_{in}$ representing the electromagnetic wave electric field component in external fiber 13,14 provided through integrated waveguide 17, $E_{cw}$ representing the clockwise traveling electromagnetic waves which have been coupled back into external optical fiber 13,14 from resonator 10, and constants $c_3$ and $c_4$ again representing various fractional couplings, losses and phase delays on these electromagnetic wave electric field components reaching photodetector 23.

Because the electric field components from two different paths in the electromagnetic waves reaching photodetectors 22 and 23 will interfere with each other upon arrival, the intensities at these detectors must be written as:

$$I_{d-22} = E_{d-22} \cdot E^*_{d-22} = |c_1 q E'_{in}|^2 + |c_2 E_{ccw}|^2 + 2|c_1 q E'_{in}||c_2 E_{ccw}| \cos \sigma_1$$

$$I_{d-23} = E_{d-23} \cdot E^*_{d-23} = |c_3 q' E'_{in}|^2 + |c_4 E_{cw}|^2 + 2|c_3 q' E'_{in}||c_4 E_{cw}| \cos \sigma_2$$

with $\sigma$ being the phase difference between the components of the electromagnetic waves from two paths reaching a corresponding photodetector. As a result, the equations characterizing the system of FIGS. 5A and 5B will differ somewhat from the equations given previously characterizing the other systems described previously. In fact, the occurrence of resonance in resonator 10 leading to a peak in the electromagnetic energy therein at the frequency giving such resonance will lead to a cancellation at the photodetectors in FIG. 5B so that resonance is represented by a null in the intensity impinging on those photodetectors. Nevertheless, an analysis of the system of FIGS. 5A and 5B taking these differences into account will yield equations showing a similar characteristic determinant for the feedback loops involving reset modulation generators 50 and 51 as were found for the preceding systems. This result again means that there will be an error signal source to control the resetting of the serrodyne waveforms of the serrodyne generators of FIGS. 5A and 5B to force the amplitudes of the phase resets toward $2\pi$.

Although the present invention has been described with reference to preferred embodiments, workers skilled in the art will recognize that changes may be made in form and detail without departing from the spirit and scope of the invention.

What is claimed is:

1. An amplitude reset controller for a first phase modulator in a rotation sensor capable of sensing rotation about an axis of a coiled optical fiber forming a closed optical path in conjunction with at least a first coil coupler which is connected therewith such that electromagnetic waves can be coupled between said coiled optical fiber and a first external optical fiber, said rotation sensing based on having opposing electromagnetic waves propagating through said coiled optical fiber in opposing directions so as to result in each said opposing coiled optical fiber electromagnetic wave impinging at least in part on a corresponding one of first and second photodetectors with at least one of said opposing coiled optical fiber electromagnetic waves propagating in one of said opposing directions being subject to having phasing thereof varied by selected signals supplied to a first input of said first phase modulator, said first photodetector providing an output signal in response to such impingement thereon of a corresponding said opposing coiled optical fiber electromagnetic wave which is representative of that wave, said amplitude reset controller comprising:

a first controlled frequency adjustment signal generator means having a modulation input and having an output electrically connected to said first phase modulator first input, said first controlled frequency adjustment signal generator means being capable of providing an output signal at said output thereof having a basic waveform portion repeated at a selected first shift operation frequency and consisting of a relatively long duration of substantially monotonically changing magnitude in one magnitude direction followed by a much shorter duration of substantially monotonically changing magnitude in an opposite magnitude direction, and being further capable of adjusting values of amplitudes of said repeated basic waveform portions in accord with selected signals provided at said modulation input thereof;

a first controlled amplitude adjustment signal generator means having a control input and having an output electrically connected to said first controlled frequency adjustment signal generator means modulation input, said first controlled amplitude adjustment signal generator means being capable of providing an output signal at said output thereof containing a substantial signal component at a selected first modulating frequency having a magnitude which varies in accord with selected signals provided on said control input thereof; and a first amplitude adjustment phase detection means having both a detection input, electrically connected to said first photodetector to receive said first photodetector output signal, and a demodulation input, electrically connected to said first controlled amplitude adjustment signal generator means output, and having an output electrically connected to said first controlled amplitude adjustment signal generating means control input, said first amplitude adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

2. The apparatus of claim 1 wherein said first external optical fiber is positioned with respect to said first phase modulator such that electromagnetic waves passing through at least a portion thereof also pass through said first phase modulator so as to be subject to having phases thereof varied in response to selected signals applied to said first phase modulator first input.

3. The apparatus of claim 1 wherein said first controlled frequency adjustment signal generator means has said output thereof electrically connected to said first phase modulator first input through a first resonance determination summing means having a first input electrically connected to said first controlled frequency adjustment signal generator means output and having an output electrically connected to said first phase modulator first input, said first resonant determination summing means also having a second input and being capable of combining selected signals provided at said first and second inputs thereof to provide an output signal on said output thereof based on such combined signals; and wherein said apparatus further comprises a first resonance determination signal generating means having an output electrically connected to said first resonance determination summing means second input, said first resonance determination signal generator means being capable of providing an output signal containing a substantial signal component at a selected resonance monitoring frequency.

4. The apparatus of claim 1 further comprising a first supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said first supplementary phase modulator; and wherein said apparatus yet further comprises a first resonance determination signal generating means having an output electrically connected to said first supplementary phase modulator first input, said first resonance determination signal generator means being capable of providing an output signal containing a substantial signal component at a selected resonance monitoring frequency.

5. The apparatus of claim 1 wherein said rotation sensor further comprises a second phase modulator with a said opposing coiled optical fiber electromagnetic waves propagating in that one of said opposing directions remaining being subject to having phasing thereof varied by selected signals supplied to a first input of said second phase modulator, said second photodetector providing an output signal in response to such impingement thereon of a corresponding said opposing coiled optical fiber electromagnetic wave which is representative of that wave, said amplitude reset controller further comprising:

a second controlled frequency adjustment signal generator means having a modulation input and having an output electrically connected to said second phase modulator first input, said second controlled frequency adjustment signal generator means being capable of providing an output signal at said output thereof having a basic waveform portion repeated at selected second shift operation frequencies consisting of a relatively long duration of substantially monotonically changing magnitude in one magnitude direction followed by a much shorter duration of substantially monotonically changing magnitude in an opposite magnitude direction, and being further capable of adjusting values of amplitudes of said repeated basic waveform portions in accord with selected signals provided at said modulation input thereof;

a second controlled amplitude adjustment signal generator means having a control input and having an output electrically connected to said second controlled frequency adjustment signal generator means modulation input, said second controlled amplitude adjustment signal generator means being capable of providing an output signal at said output thereof containing a substantial signal component at a selected second modulating frequency having a magnitude which varies in accord with selected signals provided on said control input thereof; and a second amplitude adjustment phase detection means having both a detection input, electrically connected to said second photodetector to receive said second photodetector output signal, and a demodulation input, electrically connected to said second controlled amplitude adjustment signal generator means output, and having an output electrically connected to said second controlled amplitude adjustment signal generating means control input, said second amplitude adjustment phase detection means being capable of using signals supplied at said demodulation input thereof, having a substantial demodulation signal component therein at a second selected demodulation frequency, to cause signals to appear at said output thereof representing amplitudes of components of signals occurring at said detection input thereof based on said second demodulation frequency.

6. The apparatus of claim 1 wherein said first amplitude adjustment phase detection means output is electrically connected to said first controlled amplitude adjustment signal generating means control input through a controlled switching means so that signals can be selectively transmitted and prevented from being transmitted therebetween under direction of signals provided on a control input of said controlled switching means; and further comprising a low frequency sensor having an output electrically connected to said controlled switching means control input with said low frequency sensor being capable of determining if said first shift operation frequency is less than a selected frequency value and, if so, of providing a signal on said controlled switching means directing a blocking of signals from being transmitted therethrough.

7. The apparatus of claim 1 wherein a time integration means is electrically connected between said first amplitude adjustment phase detection means output and said first controlled amplitude adjustment signal generating means control input.

8. The apparatus of claim 2 wherein said first external optical fiber and said first phase modulator are part of a coiled optical fiber input means capable of having opposing electromagnetic waves, supplied from a common source of electromagnetic waves, propagate commonly through both of said first external optical fiber and said first phase modulator in opposite directions.

9. The apparatus of claim 2 wherein said coiled optical fiber is a single spatial mode optical fiber exhibiting birefringence so that differing indices of refraction occur along corresponding axes having an angular relationship with one another on cross sections of said optical fiber, and wherein said closed optical path including said coiled optical fiber has a transfer means therealong for transferring electromagnetic radiation propagating along one of said axes into propagating along another of said axes.

10. The apparatus of claim 2 wherein said first external optical fiber has first and second output couplers connected therewith such that electromagnetic waves can be coupled between said first external optical fiber and a corresponding output optical path leading to a corresponding one of said first and second photodetectors.

11. The apparatus of claim 2 wherein said coiled optical fiber has a second coil coupler connected therewith such that electromagnetic waves can be coupled between said coiled optical fiber and a second external optical fiber, said second coil coupler having a pair of ends each positioned so that electromagnetic waves emanating therefrom impinge on a corresponding one of said first and second photodetectors.

12. The apparatus of claim 3 wherein said first controlled amplitude adjustment signal generator means has both a first amplitude adjustment waveform signal generator means and a first amplitude adjustment summing means therein with said first amplitude adjustment waveform signal generator means having an output thereof electrically connected to a first input of said first amplitude adjustment summing means, said first amplitude adjustment summing means having a second input electrically connected to said first controlled amplitude adjustment signal generator means control input and having an output serving as said first controlled amplitude adjustment signal generator means output, said first amplitude adjustment waveform signal generator means being capable of providing an output signal at said output thereof at said selected first modulating frequency of a selected magnitude, said first amplitude adjustment summing means being capable of combining selected signals provided at said first and second inputs thereof to provide an output signal on said output thereof based on such combined signals.

13. The apparatus of claim 3 wherein said first controlled frequency adjustment signal generator means also has a frequency adjustment input, said first controlled frequency adjustment signal generator means being capable of selecting among said first shift operation frequencies based on signals appearing on said frequency adjustment input thereof; and wherein said apparatus further comprises a first frequency adjustment phase detection means having both a detection input, electrically connected to said first photodetector to receive said first photodetector output signal, and a demodulation input, electrically connected to said first resonance determination signal generating means output, and having an output electrically connected to said first controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

14. The apparatus of claim 4 wherein said first controlled amplitude adjustment signal generator means has both a first amplitude adjustment waveform signal generator means and a first amplitude adjustment summing means therein with said first amplitude adjustment waveform signal generator means having an output thereof electrically connected to a first input of said first amplitude adjustment summing means, said first amplitude adjustment summing means having a second input electrically connected to said first controlled amplitude adjustment signal generator means control input and having an output serving as said first controlled amplitude adjustment signal generator means output, said first amplitude adjustment waveform signal generator means being capable of providing an output signal at said output thereof at said selected first modulating frequency of a selected magnitude, said first amplitude adjustment summing means being capable of combining selected signals provided at said first and second inputs thereof to provide an output signal on said output thereof based on such combined signals.

15. The apparatus of claim 4 wherein said first controlled frequency adjustment signal generator means also has a frequency adjustment input, said first controlled frequency adjustment signal generator means being capable of selecting among said first shift operation frequencies based on signals appearing on said frequency adjustment input thereof; and wherein said apparatus further comprises a first frequency adjustment phase detection means having both a detection input, electrically connected to said first photodetector to receive said first photodetector output signal, and a demodulation input, electrically connected to said first resonance determination signal generating means output, and having an output electrically connected to said first controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

16. The apparatus of claim 5 wherein said first controlled frequency adjustment signal generator means has said output thereof electrically connected to said first phase modulator first input through a first resonance determination summing means having a first input electrically connected to said first controlled frequency adjustment signal generator means output and having an output electrically connected to said first phase modulator first input, said first resonant determination summing means also having a second input and being capable of combining selected signals provided at said first and second inputs thereof to provide an output signal on said output thereof based on such combined signals; and wherein said second controlled frequency adjustment signal generator means has said output thereof electrically connected to said second phase modulator first input through a second resonance determination summing means having a first input electrically connected to said second controlled frequency adjustment signal generator means output and having an output electrically connected to said second phase modulator first input, said second resonant determination summing means also having a second input and being capable of combining selected signals provided at said first and second inputs thereof to provide an output signal on said output thereof based on such combined signals; and wherein said apparatus further comprises a first resonance determination signal generating means having an output electrically connected to said first resonance determination summing means second input, said first resonance determination signal generator means being capable of providing an output signal containing a substantial signal component at a selected resonance monitoring frequency; and wherein said apparatus also further comprises a second resonance determination signal generating means having an output electrically connected to said second resonance determination summing means second input, said second resonance determination signal generator means being capable of providing an output signal containing a substantial signal component at a selected resonance monitoring frequency.

17. The apparatus of claim 5 further comprising a first supplementary phase modulator positioned with respect to said first phase modulator such that electromagnetic waves subject to having phases thereof varied in response to selected signals applied to said first phase modulator first input are also subject to having phases thereof varied in response to selected signals applied to a first input of said first supplementary phase modulator; and further comprising a second supplementary phase modulator positioned with respect to said second phase modulator such that electromagnetic waves subject to having phases thereof varied in response to selected signals applied to said second phase modulator first input are also subject to having phases thereof varied in response to selected signals applied to a first input of said second supplementary phase modulator; and wherein said apparatus also further comprises a first resonance determination signal generating means having an output electrically connected to said first supplementary phase modulator first input, said first resonance determination signal generator means being capable of providing an output signal containing a substantial signal component at a selected resonance monitoring frequency; and wherein said apparatus yet further comprises a second resonance determination signal generating means having an output electrically connected to said second supplementary phase modulator first input, said second resonance determination signal generator means being capable of providing an output signal containing a substantial signal component at a selected resonance monitoring frequency.

18. The apparatus of claim 6 wherein a time integration means is electrically connected between said first amplitude adjustment phase detector means output and said controlled switching means.

19. The apparatus of claim 12 wherein said first amplitude adjustment summing means has said second input thereof electrically connected to said first controlled amplitude adjustment signal generator means control input through a first reference summing means having a first input electrically connected to said first controlled amplitude adjustment signal generator means control input and having an output electrically connected to said first amplitude adjustment summing means second input, said first reference summing means also having a second input electrically connected to a source of reference signals and being capable of combining selected signals provided at said first and second inputs thereof to provide an output signal on said output thereof based on such combined signals.

20. The apparatus of claim 13 in which said second photodetector also provides an output signal in response to impingement thereon of a corresponding said opposing coiled optical fiber electromagnetic wave which is representative of such wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a selected resonance monitoring frequency; and yet further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

21. The apparatus of claim 13 wherein said first amplitude adjustment phase detection means output is electrically connected to said first controlled amplitude adjustment signal generating means control input through a controlled switching means so that signals can be selectively transmitted and prevented from being transmitted therebetween under direction of signals provided on a control input of said controlled switching means; and further comprising a low frequency sensor having an output electrically connected to said controlled switching means control input with said low frequency sensor being capable of determining if said first shift operation frequency is less than a selected frequency value and, if so, of providing a signal on said controlled switching means directing a blocking of signals from being transmitted therethrough.

22. The apparatus of claim 14 wherein said first amplitude adjustment summing means has said second input thereof electrically connected to said first controlled amplitude adjustment signal generator means control input through a first reference summing means having a first input electrically connected to said first controlled amplitude adjustment signal generator means control input and having an output electrically connected to said first amplitude adjustment summing means second input, said first reference summing means also having a second input electrically connected to a source of reference signals and being capable of combining selected signals provided at said first and second inputs thereof to provide an output signal on said output thereof based on such combined signals.

23. The apparatus of claim 15 in which said second photodetector also provides an output signal in response to impingement thereon of a corresponding said opposing coiled optical fiber electromagnetic wave which is representative of that wave, and further comprising a second phase modulator with said first external optical fiber being positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second resonance determination signal generating means having an output electrically connected to said second phase modulator first input, said second resonance determination signal generator means being capable of providing an output signal containing a substantial signal component at a selected resonance monitoring frequency; and yet further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

24. The apparatus of claim 15 wherein said first amplitude adjustment phase detection means output is electrically connected to said first controlled amplitude adjustment signal generating means control input through a controlled switching means so that signals can be selectively transmitted and prevented from being transmitted therebetween under direction of signals provided on a control input of said controlled switching means; and further comprising a low frequency sensor having an output electrically connected to said controlled switching means control input with said low frequency sensor being capable of determining if said first shift operation frequency is less than a selected frequency value and, if so, of providing a signal on said controlled switching means directing a blocking of signals from being transmitted therethrough.

25. The apparatus of claim 16 wherein said first controlled amplitude adjustment signal generator means has both a first amplitude adjustment waveform signal generator means and a first amplitude adjustment summing means therein with said first amplitude adjustment waveform signal generator means having an output thereof electrically connected to a first input of said first amplitude adjustment summing means, said first amplitude adjustment summing means having a second input electrically connected to said first controlled amplitude adjustment signal generator means control input and having an output serving as said first controlled amplitude adjustment signal generator means output, said first amplitude adjustment waveform signal generator means being capable of providing an output signal at said output thereof at said selected first modulating frequency of a selected magnitude, said first amplitude adjustment summing means being capable of combining selected signals provided at said first and second inputs thereof to provide an output signal on said output thereof based on such combined signals; and wherein said second controlled amplitude adjustment signal generator means has both a second amplitude adjustment waveform signal generator means and a second amplitude adjustment summing means therein with said second amplitude adjustment waveform signal generator means having an output thereof electrically connected to a first input of said second amplitude adjustment summing means, said second amplitude adjustment summing means having a second input electrically connected to said second controlled amplitude adjustment signal generator means control input and having an output serving as said second controlled amplitude adjustment signal generator means output, said second amplitude adjustment waveform signal generator means being capable of providing an output signal at said output thereof at said selected second modulating frequency of a selected magnitude, said second amplitude adjustment summing means being capable of combining selected signals provided at said first and second inputs thereof to provide an output signal on said output thereof based on such combined signals.

26. The apparatus of claim 16 wherein said first controlled frequency adjustment signal generator means also has a frequency adjustment input, said first controlled frequency adjustment signal generator means being capable of selecting among said first shift operation frequencies based on signals appearing on said frequency adjustment input thereof; and wherein said apparatus further comprises a first frequency adjustment phase detection means having both a detection input, electrically connected to said first photodetector to receive said first photodetector output signal, and a demodulation input, electrically connected to said first resonance determination signal generating means output, and having an output electrically connected to said first controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

27. The apparatus of claim 17 wherein said first controlled amplitude adjustment signal generator means has both a first amplitude adjustment waveform signal generator means and a first amplitude adjustment summing means therein with said first amplitude adjustment waveform signal generator means having an output thereof electrically connected to a first input of said first amplitude adjustment summing means, said first amplitude adjustment summing means having a second input electrically connected to said first controlled amplitude adjustment signal generator means control input and having an output serving as said first controlled amplitude adjustment signal generator means output, said first amplitude adjustment waveform signal generator means being capable of providing an output signal at said output thereof at said selected first modulating frequency of a selected magnitude, said first amplitude adjustment summing means being capable of combining selected signals provided at said first and second inputs thereof to provide an output signal on said output thereof based on such combined signals; and wherein said second controlled amplitude adjustment signal generator means has both a second amplitude adjustment waveform signal generator means and a second amplitude adjustment summing means therein with said second amplitude adjustment waveform signal generator means having an output thereof electrically connected to a first input of said second amplitude adjustment summing means, said second amplitude adjustment summing means having a second input electrically connected to said second controlled amplitude adjustment signal generator means control input and having an output serving as said second controlled amplitude adjustment signal generator means output, said second amplitude adjustment waveform signal generator means being capable of providing an output signal at said output thereof at said selected second modulating frequency of a selected magnitude, said second amplitude adjustment summing means being capable of combining selected signals provided at said first and second inputs thereof to provide an output signal on said output thereof based on such combined signals.

28. The apparatus of claim 17 wherein said first controlled frequency adjustment signal generator means also has a frequency adjustment input, said first controlled frequency adjustment signal generator means being capable of selecting among said first shift operation frequencies based on signals appearing on said frequency adjustment input thereof; and said apparatus further comprises a first frequency adjustment phase detection means having both a detection input, electrically connected to said first photodetector to receive said first photodetector output signal, and a demodulation output, electrically connected to said first resonance determination signal generating means output, and having an output electrically connected to said first controlled frequency adjustment signal generator means frequency adjustment input, said first frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

29. The apparatus of claim 21 wherein said first controlled frequency adjustment signal generator means output is electrically connected to said first frequency adjustment phase detection means in a manner such that each said shorter duration of said basic waveform in said output signal of said first controlled frequency adjustment signal generator means, repeated as aforesaid at said selected first shift operation frequency, initiates a selected fixed value at said output of said first frequency adjustment phase detection means for a corresponding selected duration irrespective of signals provided at said detection input thereof during said corresponding selected durations, said initiation of said selected fixed value irrespective of said signals at said detection input for said corresponding durations occurring in a range of values of said selected first shift operation frequency.

30. The apparatus of claim 24 wherein said first controlled frequency adjustment signal generator means output is electrically connected to said first frequency adjustment phase detection means in a manner such that each said shorter duration of said basic waveform in said output signal of said first controlled frequency adjustment signal generator means, repeated as aforesaid at said selected first shift operation frequency, initiates a selected fixed value at said output of said first frequency adjustment phase detection means for a corresponding selected duration irrespective of signals provided at said detection input thereof during said corresponding selected durations, said initiation of said selected fixed value irrespective of said signals at said detection input for said corresponding durations occurring in a range of values of said selected first shift operation frequency.

31. The apparatus of claim 25 wherein said first amplitude adjustment summing means has said second input thereof electrically connected to said first controlled amplitude adjustment signal generator means control input through a first reference summing means having a first input electrically connected to said first controlled amplitude adjustment signal generator means control input and having an output electrically connected to said first amplitude adjustment summing means second input, said first reference summing means also having a second input electrically connected to a source of reference signals and being capable of combining selected signals provided at said first and second inputs thereof to provide an output signal on said output thereof based on such combined signals; and wherein said second amplitude adjustment summing means has said second input thereof electrically connected to said second controlled amplitude adjustment signal generator means control input through a second reference summing means having a first input electrically connected to said second controlled amplitude adjustment signal generator means control input and having an output electrically connected to said second amplitude adjustment summing means second input, said second reference summing means also having a second input electrically connected to a source of reference signals and being capable of combining selected signals provided at said first and second inputs thereof to provide an output signal on said output thereof based on such combined signals.

32. The apparatus of claim 26 wherein said first external optical fiber is positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

33. The apparatus of claim 27 wherein said first amplitude adjustment summing means has said second input thereof electrically connected to said first controlled amplitude adjustment signal generator means control input through a first reference summing means having a first input electrically connected to said first controlled amplitude adjustment signal generator means control input and having an output electrically connected to said first amplitude adjustment summing means second input, said first reference summing means also having a second input electrically connected to a source of reference signals and being capable of combining selected signals provided at said first and second inputs thereof to provide an output signal on said output thereof based on such combined signals; and wherein said second amplitude adjustment summing means has said second input thereof electrically connected to said second controlled amplitude adjustment signal generator means control input through a second reference summing means having a first input electrically connected to said second controlled amplitude adjustment signal generator means control input and having an output electrically connected to said second amplitude adjustment summing means second input, said second reference summing means also having a second input electrically connected to a source of reference signals and being capable of combining selected signals provided at said first and second inputs thereof to provide an output signal on said output thereof based on such combined signals.

34. The apparatus of claim 28 wherein said first external optical fiber is positioned with respect to said second phase modulator such that electromagnetic waves passing through at least a portion thereof also pass through said second phase modulator so as to be subject to having phases thereof varied in response to selected signals applied to said second phase modulator first input, said first external optical fiber and said first and second phase modulators being part of a coiled optical fiber input means capable of having opposing electromagnetic waves, supplied from a common source means of electromagnetic waves, propagate commonly through each of said first external optical fiber and said first and second phase modulators in opposite directions, said common source means having a control input at which provision of selected signals results in selected frequencies occurring in said electromagnetic waves provided thereby; and wherein said apparatus further comprises a second frequency adjustment phase detection means having both a detection input, electrically connected to said second photodetector to receive said second photodetector output signal, and a demodulation input, electrically connected to said second resonance determination signal generating means output, and having an output electrically connected to said common source means control input, said second frequency adjustment phase detection means being capable of using signals supplied at said demodulation input thereof, having a substantial demodulation signal component therein at a selected demodulation frequency, to cause signals to appear at said output thereof representing amplitudes of components of signals occurring at said detection input thereof based on said demodulation frequency.

35. A selectable amplitude reset controller for a first phase modulator in a rotation sensor capable of sensing rotation about an axis of a coiled optical fiber forming a closed optical path in conjunction with at least a first coil coupler which is connected therewith such that electromagnetic waves can be coupled between said coiled optical fiber and a first external fiber, said rotation sensing based on having opposing electromagnetic waves propagating through said coiled optical fiber in opposing directions so as to result in each said opposing coiled optical fiber electromagnetic wave impinging on a corresponding one of first and second photodetectors with at least one of said opposing coiled optical fiber electromagnetic waves propagating in one of said opposing directions being subject to having phasing thereof varied by selected signals supplied to a first input of said first phase modulator, said first photodetector providing an output signal in response to such impingement thereon of a corresponding said opposing coiled optical fiber electromagnetic wave which is representative of that wave, said selectable amplitude reset controller comprising:

a first controlled frequency adjustment signal generator means having an output electrically connected to said first phase modulator first input, said first controlled frequency adjustment signal generator means being capable of providing an output signal at said output thereof having a basic waveform portion repeated at a selected first shift operation frequency and consisting of a relatively longer duration of substantially monotonically changing magnitude in one magnitude direction followed by a much shorter duration of substantially monotonically changing magnitude in an opposite magnitude direction, said first controlled frequency adjustment signal generator means having a frequency adjustment input to be capable of selecting among values for said first shift operation frequency based on signals appearing thereon with said first controlled frequency adjustment signal generator means frequency adjustment input being in a first feedback circuit which receives said first photodetector output signal to thereby selectively direct that a value be selected for said first shift operation frequency by said first controlled frequency adjustment signal generator means resulting in that opposing coiled optical fiber electromagnetic wave having a portion thereof reaching said first photodetector being in resonance in said coiled optical fiber, said first controlled frequency adjustment signal generator means having an amplitude adjustment input to be capable of selecting among values for a phase magnitude change in each said shorter duration of said basic waveform as a reset magnitude based on signals appearing thereon with said first controlled frequency adjustment signal generator means amplitude adjustment input being in a second feedback circuit which receives said first photodetector signal to thereby selectively direct that a value be selected for said reset magnitude by said first controlled frequency adjustment signal generator means resulting in a selected magnitude for said reset magnitude;

a first controlled switching means in said second feedback circuit capable of permitting and preventing signal transmission through said second feedback circuit under direction of signals applied to a controlled input thereof; and a first frequency sensor capable of sensing values of said first shift operation frequency and having an output electrically connected to said controlled switching means control input to direct said controlled switching means to selectively permit and prevent signals being transmitted through said second feedback circuit depending on values of said first shift operation frequency.

36. The apparatus of claim 35 wherein said first feedback circuit has a signal source selection means provided therein having a control input and capable of selectively providing for transmission through at least a portion of said first feedback circuit to said first frequency controlled frequency adjustment signal generator means frequency adjustment input a signal from one of first and second sources of signals based on signals provided on said control input thereof, said first source of signals being those provided by a portion of said first feedback circuit based on said first photodetector signal, said second source of signals being a source external to said first feedback circuit providing a selected external signal; and wherein said frequency detection means has a second output electrically connected to said signal source selection means control input so as to be capable of directing said signal source selection means to provide signals to said first frequency controlled frequency adjustment signal generator means frequency adjustment input from one of said first and second sources based on values of said first shift operation frequency and on occurrences of said short durations.

37. The apparatus of claim 36 wherein a time integration means is provided between said signal source selection means and said first frequency controlled frequency adjustment signal generator means frequency adjustment input.

38. A method for selectively controlling amplitudes of phase resets in a first phase modulator in a rotation sensor capable of sensing rotation about an axis of a coiled optical fiber forming a closed optical path in conjunction with at least a first coil coupler which is connected therewith such that electromagnetic waves can be coupled between said coiled optical fiber and a first external fiber, said rotation sensing based on having opposing electromagnetic waves propagating through said coiled optical fiber in opposing directions so as to result in each said opposing coiled optical fiber electromagnetic wave impinging on a corresponding one of first and second photodetectors with at least one of said opposing coiled optical fiber electromagnetic waves propagating in one of said opposing directions being subject to having phasing thereof varied by selected signals supplied to a first input of said first phase modulator, said first photodetector providing an output signal in response to such impingement thereon of a corresponding said opposing coiled optical fiber electromagnetic wave which is representative of that wave, said first input of said first phase modulator being electrically connected to an output of a first controlled frequency adjustment signal generator means, said first controlled frequency adjustment signal generator means being capable of providing an output signal at said output thereof having a basic waveform portion repeated at a selected first shift operation frequency and consisting of a relatively longer duration of substantially monotonically changing magnitude in one magnitude direction followed by a much shorter duration of substantially monotonically changing magnitude in an opposite magnitude direction, said first controlled frequency adjustment signal generator means having a frequency adjustment input to be capable of selecting among values for said first shift operation frequency based on signals appearing thereon with said first controlled frequency adjustment signal generator means frequency adjustment input being in a first feedback circuit which receives said first photodetector output signal to thereby selectively direct that a value be selected for said first shift operation frequency by said first controlled frequency adjustment signal generator means resulting in that opposing coiled optical fiber electromagnetic wave having a portion thereof reaching said first photodetector being in resonance in said coiled optical fiber, said first controlled frequency adjustment signal generator means having an amplitude adjustment input to be capable of selecting among values for a phase magnitude change in each said shorter duration of said basic waveform as a reset magnitude based on signals appearing thereon with said first controlled frequency adjustment signal generator means amplitude adjustment input being in a second feedback circuit which receives said first photodetector signal to thereby selectively direct that a value be selected for said reset magnitude by said first controlled frequency adjustment signal generator means resulting in a selected magnitude for said reset magnitude, said method comprising:

sensing values of said first shift operation frequency; and preventing signals from being transmitted through said second feedback circuit if values of said first shift operation frequency have a selected relative magnitude relationship with a selected first shift operation frequency value.

39. The method of claim 38 further comprising:
sensing occurrences of said short durations; and
supplying signals to said first controlled frequency adjustment signal generator means frequency adjustment input through at least a portion of said first feedback circuit from one of first and second sources of signals based on values of said first shift operation frequency and on occurrences of said short durations, said first source of signals being those provided by a portion of said first feedback circuit based on said first photodetector signal, and said second source of signals being a source external to said first feedback circuit providing a selected external signal.

40. The method of claim 39 further comprising integrating in time those signals supplied by said first and second sources before providing them to said first controlled frequency adjustment signal generator means frequency adjustment input.

* * * * *